US008423894B2

(12) United States Patent
Bhattacharya et al.

(10) Patent No.: US 8,423,894 B2
(45) Date of Patent: *Apr. 16, 2013

(54) METHOD AND SYSTEM FOR DISPLAYING NETWORK SECURITY INCIDENTS

(75) Inventors: Partha Bhattacharya, Cupertino, CA (US); Imin T. Lee, San Jose, CA (US); Aji Joseph, San Jose, CA (US); Eli Stevens, Santa Clara, CA (US); Diwakar Naramreddy, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 371 days.

This patent is subject to a terminal disclaimer.

(21) Appl. No.: 12/619,519

(22) Filed: Nov. 16, 2009

(65) Prior Publication Data
US 2010/0058165 A1      Mar. 4, 2010

Related U.S. Application Data

(63) Continuation of application No. 10/661,224, filed on Sep. 12, 2003, now Pat. No. 7,644,365.

(51) Int. Cl.
*G06F 3/00* (2006.01)
(52) U.S. Cl.
USPC .......................... 715/734; 715/736; 715/733
(58) Field of Classification Search ............... 715/734, 715/736, 733
See application file for complete search history.

(56) References Cited

U.S. PATENT DOCUMENTS

| 5,566,339 A | 10/1996 | Perholtz et al. |
| 5,929,855 A | 7/1999 | Benton et al. |
| 6,088,804 A | 7/2000 | Hill et al. |
| 6,233,575 B1 | 5/2001 | Agrawal et al. |
| 6,502,133 B1 | 12/2002 | Baulier et al. |
| 6,505,192 B1 | 1/2003 | Godwin et al. |
| 6,550,012 B1 | 4/2003 | Villa et al. |
| 6,609,205 B1 | 8/2003 | Bernhard et al. |
| 6,647,400 B1 | 11/2003 | Moran |

(Continued)

FOREIGN PATENT DOCUMENTS

JP        2002/261788      9/2002

OTHER PUBLICATIONS

International Searching Authority, "Notification of Transmittal of the International Search Report and the Written Opinion of the International Searching Authority, or the Declaration," PCT/US04/29185, mailed on Dec. 26, 2005, 8 pages.

Current Claims, PCT/US04/29185, 8 pages.

(Continued)

*Primary Examiner* — William Bashore
*Assistant Examiner* — Mylinh Tran
(74) *Attorney, Agent, or Firm* — Hickman Palermo Truong Becker Bingham Wong LLP

(57) ABSTRACT

A network security monitor system groups a plurality of security events into network sessions, correlates the network sessions according to a set of predefined network security event correlation rules and generates a security incident for the network sessions that satisfy one of the network security event correlation rules. The system then presents the information of the network sessions and security incidents to a user of the system in an intuitive form. The user is able to not only learn the details of a possible network attack, but also creates new security event correlation rules intuitively, including drop rules for dropping a particular type of events.

21 Claims, 32 Drawing Sheets

U.S. PATENT DOCUMENTS

| | | | |
|---|---|---|---|
| 6,704,874 | B1 | 3/2004 | Porras et al. |
| 6,717,949 | B1 | 4/2004 | Boden et al. |
| 6,728,885 | B1 | 4/2004 | Taylor et al. |
| 6,795,918 | B1 | 9/2004 | Trolan |
| 6,816,455 | B2 | 11/2004 | Goldberg et al. |
| 6,826,564 | B2 | 11/2004 | Thompson et al. |
| 6,826,697 | B1 | 11/2004 | Moran |
| 6,829,239 | B1 | 12/2004 | Bhatia et al. |
| 6,883,162 | B2 | 4/2005 | Jackson et al. |
| 6,886,102 | B1 | 4/2005 | Lyle |
| 6,920,453 | B2 | 7/2005 | Mannila et al. |
| 6,950,845 | B2 | 9/2005 | Givoly |
| 6,985,920 | B2 | 1/2006 | Bhattacharya et al. |
| 7,143,442 | B2 | 11/2006 | Scarfe et al. |
| 7,171,689 | B2 | 1/2007 | Beavers |
| 7,246,166 | B1 | 7/2007 | Watson |
| 7,299,504 | B1 | 11/2007 | Tiller et al. |
| 7,418,733 | B2 | 8/2008 | Connary et al. |
| 7,424,742 | B1 | 9/2008 | Dash et al. |
| 7,478,151 | B1 | 1/2009 | Maiocco et al. |
| 7,483,972 | B2 | 1/2009 | Bhattacharya et al. |
| 7,627,544 | B2 | 12/2009 | Chkodrov et al. |
| 7,761,918 | B2 | 7/2010 | Gula et al. |
| 7,961,594 | B2 * | 6/2011 | Alon et al. .................... 370/216 |
| 2002/0019945 | A1 * | 2/2002 | Houston et al. ............... 713/201 |
| 2002/0053033 | A1 | 5/2002 | Cooper et al. |
| 2002/0152185 | A1 | 10/2002 | Jamadagni |
| 2002/0199024 | A1 | 12/2002 | Givoly et al. |
| 2003/0009547 | A1 | 1/2003 | Benfield et al. |
| 2003/0033402 | A1 | 2/2003 | Battat et al. |
| 2003/0093514 | A1 | 5/2003 | Valdes et al. |
| 2003/0120935 | A1 | 6/2003 | Teal et al. |
| 2003/0130967 | A1 | 7/2003 | Mannila et al. |
| 2003/0149727 | A1 | 8/2003 | Jaschek et al. |
| 2003/0165121 | A1 | 9/2003 | Leung et al. |
| 2003/0182580 | A1 | 9/2003 | Lee |
| 2003/0200192 | A1 | 10/2003 | Bell et al. |
| 2003/0200318 | A1 | 10/2003 | Chen et al. |
| 2003/0204632 | A1 | 10/2003 | Willebeek-LeMair et al. |
| 2003/0236995 | A1 | 12/2003 | Fretwell |
| 2004/0015783 | A1 | 1/2004 | Lennon et al. |
| 2004/0049698 | A1 * | 3/2004 | Ott et al. ....................... 713/201 |
| 2004/0073800 | A1 | 4/2004 | Shah et al. |
| 2004/0098623 | A1 | 5/2004 | Scheidell |
| 2004/0103021 | A1 | 5/2004 | Scarfe et al. |
| 2004/0111637 | A1 | 6/2004 | Baffes et al. |
| 2004/0133672 | A1 | 7/2004 | Bhattacharya et al. |
| 2004/0250112 | A1 | 12/2004 | Valente et al. |
| 2005/0005017 | A1 * | 1/2005 | Ptacek et al. .................... 709/229 |
| 2005/0021740 | A1 | 1/2005 | Bar et al. |
| 2005/0037733 | A1 * | 2/2005 | Coleman et al. ............... 455/411 |
| 2005/0044406 | A1 | 2/2005 | Stute |
| 2006/0020582 | A1 | 1/2006 | Dettinger et al. |
| 2006/0089985 | A1 | 4/2006 | Poletto |
| 2006/0218640 | A1 | 9/2006 | Lotem et al. |
| 2006/0242694 | A1 | 10/2006 | Gold et al. |
| 2007/0086480 | A1 | 4/2007 | Elzur |
| 2007/0156656 | A1 | 7/2007 | Pather et al. |
| 2008/0016569 | A1 * | 1/2008 | Hammer et al. ................. 726/23 |
| 2008/0046572 | A1 | 2/2008 | Jagels |

OTHER PUBLICATIONS

Verwoerd, T. and Hunt, R., Security Architecture Testing using IDS—A Case Study. Computer Communications, Elsevier, U.K., vol. 25, No. 15, Sep. 2002, pp. 1402-1412.

Verwoerd, T. and Hunt, R., Intrusion Detection Techniques and Approaches. Computer Communications, Elsevier, U.K., vol. 25, No. 15, Sep. 2002, pp. 1356-1365.

Helmer, Guy G. et al., "Intelligent Agents for Intrusion Detection," Iowa State University, Ames Iowa 50011, 4 pages.

Lam, Kwok-Yan et al., "Multivariate Data Analysis Software for Enhancing System Security," Journal of Systems Software, Dec. 1995, vol. 31, Issue 3, pp. 267-275.

Ning, Peng et al., "Abstraction-Based Intrusion Detection in Distributed Environments," 2001, ACM Transactions on Information and System Security (TISSEC), vol. 4, Issue 4, pp. 407-452.

Yener et al., "A Formal Method for Attach Modeling and Detection", Computer Science Department, Rensselaer Polytechnic Institute, Jun. 2001, 17 pages.

European Patent Office, EP Supplemental International Search Report received in International Application No. 04777068.0 dated Jun. 6, 2012 (3 pages).

Current Claims, EP Application No. 04777068.0 (5 pages), dated Jun. 2012.

D. Schnackenberg et al., entitled "Infrastructure for Intrusion Detection and Response", IEEE © 1999, 9 pages.

Tanja Zseby et al., entitled "IPFIX Applicability" dated Jun. 2002 (16 pgs).

* cited by examiner

FIG. 7

PROTEGO NETWORKS

| SUMMARY | INCIDENTS | RULES | EVENT MANAGEMENT | QUERY/REPORTS | ADMIN | HELP | ABOUT |

Incidents | False Positives

INCIDENTS | About :: Version 1.0    login: Administrator, Administrator (pnadmin) :: Logout :: Jul 21, 2003 5:51:45 PM PDT :: Activate 685029    Show Incident ID    Show Session ID Matched Rule: Successful Reconn and Buffer Overflow
Description: Successful Reconn and Buffer Overflow

| Offset | Open | Source IP | Destination IP | Service Name | Event | Device | Severity | Counts | Zone | Action/Operation | Time-range |
|---|---|---|---|---|---|---|---|---|---|---|---|
| 1 | | $TARGET02 | $TARGET01 | ANY | Probe/HostSweep/All | ANY | ANY | 1 | NY | OR | |
| 2 | | $TARGET02 | $TARGET01 | ANY | Probe/PortSweep/All | ANY | ANY | 1 | NY | FOLLOWED-BY | |
| 3 | | $TARGET02 | $TARGET01 | ANY | Penetrate/BufferOverflow/DNS,Penetrate/BufferOverflow/FTP, Penetrate/BufferOverflow/Mail,Penetrate/BufferOverflow/RPC, Penetrate/BufferOverflow/SSH,Penetrate/BufferOverflow/Telnet, Penetrate/BufferOverflow/Web | ANY | ANY | 1 | NY | FOLLOWED-BY | |
| 4 | | $TARGET01 | ANY | ANY | Info/AllTraffic | ANY | ANY | 1 | NY | Epage Close | 0hh:5mm:0ss |

Incident ID: 685029                                                                                                Escalate

| Offset | Session/Incident ID | Events | Source IP/Port | Destination IP/Port | Protocol | Time | Zone | Reporting Devices | Graph | False Positive | Mitigation |
|---|---|---|---|---|---|---|---|---|---|---|---|
| 1 | S:676852 I:685029 | [1902100] ICMP Network Sweep w/Echo | 40.40.1.23 | 192.168.1.10 | | | | | | | |
| | | | | | | Total: 2 | | | | | |
| 1 | S:676853 I:685029 | [1902100] ICMP Network Sweep w/Echo | 40.40.1.23 0 | 192.168.1.10 0 | ICMP | Jul 21, 2003 5:26:42PM PDT | CA | HQ-SW-IDSM-1 | | Tune | |
| 1 | S:676853 I:685029 | [1902100] ICMP Network Sweep w/Echo | 40.40.1.23 0 | 192.168.1.10 0 | ICMP | Jul 21, 2003 5:26:42PM PDT | CA | HQ-NIDS1 | | Tune | |
| 3 | S:676903 I:685029 | [1905126] WWW IIS .ida Indexing Service Overflow | 40.40.1.23 2500 | 192.168.1.10 80(Executor,http, http,Web-) | TCP | Jul 21, 2003 5:26:42 PM PDT | CA | HQ-NIDS1 HQ-FW-1 HQ-SW-IDSM-1 | | Tune | |
| 4 | S:676984 I:685029 | [1302001] Built/teardown/permitted IP connection | 192.168.1.10 2000 | 30.30.2.24 21(BladeRunner, DollyTrojan,Fore, ftp,InvisibleFTP, WebEx,WinCrash) | TCP | Jul 21, 2003 5:26:43 PM PDT | CA | HQ-FW-1 | | Tune | |

Protege Networks, Inc.    Summary :: Incidents :: Rules :: Event Management :: Query/Reports :: Admin :: Help :: About :: Feedback

FIG. 8

Raw Events

| Event/Session/Incident ID | Reporting Device | Time | Raw Message |
|---|---|---|---|
| E:676903, S:676903, I:685029 | HQ-FW-1 | Jul 21, 2003 5:26:42 PM PDT | 10.33.10.2<142>%PIX-6-302013: Built inbound TCP connection 2055 for outside:40.40.1.23/2500 (40.40.1.23/2500) to dmz:192.168.1.10/80 (100.1.4.10/80) |
| E:676905, S:676903, I:685029 | HQ-FW-1 | Jul 21, 2003 5:26:42 PM PDT | 10.33.10.2<142>%PIX-6-302014: Built inbound TCP connection 2055 for outside:40.40.1.23/2500 to dmz:192.168.1.10/80 duration 0:00:22 bytes 752 TCP Reset-0 |
| E:676901, S:676903, I:685029 | HQ-FW-1 | Jul 21, 2003 5:26:42 PM PDT | 10.33.10.2<141>%PIX-5-304001: 40.40.1.23 Accessed URL 100.1.4.10:.ida?<200+ chars> |
| E:676904, S:676903, I:685029 | HQ-NIDS1 | Jul 21, 2003 5:26:42 PM PDT | 40.40.1.23/2500 --> 192.168.1.10/80 TCP WWW IIS .ida Indexing Service Overflow |
| E:676900, S:676903, I:685029 | HQ-SW-IDSM-1 | Jul 21, 2003 5:26:42 PM PDT | 40.40.1.23/2500 --> 100.1.4.10/80 TCP WWW IIS .ida Indexing Service Overflow |

Protego Networks, Inc.

| Incidents | False Positives |

INCIDENTS | About :: Version 1.0     login: Administrator, Administrator (pnadmin) :: [Logout] :: Jul 14,2003 2:22:02 PM PDT :: [Activate]

Select False Positive: [Confirmed False Positive Type ▼]

| Count | Incidents | Event | Destination IP/Port | Protocol | Zone |
|---|---|---|---|---|---|
| ☐ 7 | I:415004, I:415008, I:550001, I:550008, I:550012, I:685004, I:685008 | [1903216]IIS Dot Dot Crash Attack | 172.29.99.21  80 | TCP | CA |
| ☐ 5 | I:415004, I:415008, I:550001, I:550008, I:550012 | [1905081]WWW WinNT cmd.exe Access | 172.29.99.21  80 | TCP | CA |

1 to 2 of 2  [25 per page]  ▼

[Change Status]

Protege Networks, Inc.      Summary :: Incidents :: Rules :: Event Management :: Query/Reports :: Admin :: Help :: About :: [Feedback]

Raw Events - Microsoft Internet Explorer login: Administrator, Administrator (pnadmin) :: July 14, 2003 2:35:12 PM PDT :: Close Raw Events — 1702

| Event/Session/ Incident ID | Reporting Device | Time | Raw Message |
|---|---|---|---|
| E: 675271, S: 675271, I: 685008 | HQ-FW-2 | Jul 14, 2003 2:00:57 PM PDT | 172.29.100.4 <142>%PIX-6-302013: Built inbound TCP connection 1978 for outside:20.20.1.15/2509 (20.20.1.15/2509) to inside:172.29.99.21/80 (100.1.64.21/80) |
| E: 675278, S: 675271, I: 685008 | HQ-FW-2 | Jul 14, 2003 2:00:57 PM PDT | 172.29.100.4 <142>%PIX-6-302014: Teardown TCP connection 1978 for outside:20.20.1.15/2509 to inside:172.29.99.21/80 duration 0:00:22 bytes 752 TCP Reset-O |
| E: 675272, S: 675271, I: 685008 | HQ-FW-2 | Jul 14, 2003 2:00:57 PM PDT | 172.29.100.4 <141>%PIX-5-304001: 20.20.1.15 Accessed URL 100.1.64.21:/msadc/..%255c../..%255c/..%255c/..%c1%1c../..%c1%1c../..%c1% 1c../winnt/system32/cmd.exe?/c+dir |
| E: 675275, S: 675271, I: 685008 | HQ-NIDS-2 | Jul 14, 2003 2:00:57 PM PDT | 20.20.1.15/2509--> 172.29.99.21/80 TCP IIS DOT DOT EXECUTE Attack |
| E: 675268, S: 675271, I: 685008 | HQ-SW- IDSM-1 | Jul 14, 2003 2:00:57 PM PDT | 20.20.1.15/2509--> 100.1.64.21/80 TCP IIS DOT DOT EXECUTE Attack |
| E: 675276, S: 675271, | HQ-NIDS-2 | Jul 14, 2003 2:00:57 PM | 20.20.1.15/2509--> 172.29.99.21/80 TCP IIS Dot Dot Crash Attack |

FIG. 17C

METHOD AND SYSTEM FOR DISPLAYING NETWORK SECURITY INCIDENTS

BENEFIT CLAIM

This application claims benefit as a Continuation of application Ser. No. 10/661,224, filed Sep. 12, 2003 now U.S. Pat. No. 7,644,365 the entire contents of which is hereby incorporated by reference as if fully set forth herein, under 35 U.S.C. §120. The applicant(s) hereby rescind any disclaimer of claim scope in the parent application(s) or the prosecution history thereof and advise the USPTO that the claims in this application may be broader than any claim in the parent application(s).

CROSS-REFERENCE TO RELATED APPLICATIONS

This application is related to U.S. Pat. No. 7,483,972 issued on Jan. 27, 2009 entitled NETWORK SECURITY MONITORING SYSTEM the entire contents of which is hereby incorporated by reference as if fully set forth herein.

This application is also related to U.S. Pat. No. 6,985,920 issued Jan. 10, 2006 entitled A METHOD AND SYSTEM FOR DETERMINING INTRA-SESSION EVENT CORRELATION ACROSS NETWORK ADDRESS TRANSLATION DEVICES the entire contents of which is hereby incorporated by reference as if fully set forth herein.

TECHNICAL FIELD

The present invention relates generally to the field of computer network security, and in particular to systems and methods for displaying network security incidents.

BACKGROUND

From large business transaction to personal financial management, almost every aspect of our daily life depends on the secure operation of computer networks, e.g., the Internet.

Over the past decades, different techniques have been developed to enhance the security of a computer network against attacks. For example, multiple security sensors such as intrusion detection sensors (IDS) are deployed over the Internet or a local area network (LAN) to detect suspicious network activities.

FIG. 1 illustrates a computer network having a plurality of security sensors attached to routers, firewalls, switches and hosts, etc. Each security sensor is configured such that whenever it detects any suspicious network traffic going through the device it is attached to, the security sensor sends a security event to a network security monitor system. The network security monitor system is responsible for analyzing security events coming from different sources and discovering possible network attacks. After that, the system presents the result to a user of the system, e.g., a network administrator, in a readily understandable form. In response, the user takes appropriate actions to reduce the loss caused by the attacks to a minimum level. Under some circumstances, it may be appropriate for the system to automatically block detected attacks.

Generally speaking, the information embedded in an individual security event only reveals a small aspect of a large network attack plan. The accuracy of such limited information may also be contaminated by other network devices. For example, a network address translation (NAT) device is commonly employed for translating the addresses and ports of network packets destined to or originating from internal hosts and servers within a local area network (LAN) to resolve the problem of limited address space offered by 32-bit addresses. As a result, NAT devices often hide the true source and destination address of an IP packet, which makes the packet more difficult to be analyzed.

Further, a network attack is a dynamic phenomenon that evolves with time. With the development of network technology, more complicated and better disguised attacking strategies emerge to break the current network protection measures. In response, new detection measures have to be developed to discover and defeat these new strategies.

Therefore, it would be highly desirable to have a method and system that can not only analyze security events in a real time fashion, but also present the result in an intuitive form so that the user can easily understand the characteristics of any potential or on-going attacks. It would also be desirable that the user can use the method and system to develop new strategies to catch not only current, but also future network attacks.

SUMMARY

In summary, a network security monitor system and method receive and process a plurality of security events arriving during a predefined time period, including grouping the security events into network sessions, each session having an identified source and destination, and correlating the network session according to a set of predefined security event correlation rules.

The system and method then display a graph representing devices in a network, the devices including security devices and non-security devices. The displayed graph includes a plurality of individual device symbols and a plurality of group device symbols, each individual device symbol representing a security device of the network and each group device symbol representing a group of non-security devices of the network.

In conjunction with the graph, the system and method display security incident information, including with respect to a group device symbol an incident volume indicator that indicates a number of network sessions whose source or destination is at any member of a group of non-security devices corresponding to the group device symbol.

In one embodiment, the system and method also display a second level graph representing the non-security devices in the group upon user selection of a group device symbol. The displayed second level graph further includes a plurality of non-security device symbols and a plurality of security device symbols, each non-security device symbol representing one non-security device serving as a source or destination of a network session and each security device symbol representing one security device that is in the vicinity of the non-security devices.

In another embodiment, the system and method, in response to one or more user commands, select a network session from the displayed data and define a drop rule that comprises a set of network conditions corresponding to the selected network session. Whenever there are one or more incoming security events that satisfy the set of network conditions, the system and method filter them out, either dropping them from a security event log file, or not showing them to the user, but still keeping them in the log file.

BRIEF DESCRIPTION OF THE DRAWINGS

The aforementioned features and advantages of the invention as well as additional features and advantages thereof will

FIG. 7 depicts details of one security incident, including a security event correlation rule and a list of network sessions.

FIG. 8 depicts an expanded list of network sessions that include the two sessions associated with a row of a security event correlation rule.

FIGS. 13(A)-(C) depict a set of security events, a local hotspot graph and a local vector graph associated with a network session 676903, respectively.

FIGS. 15(A)-(D) illustrate procedures for defining a false positive security event and then constructing a drop rule for the security event.

FIGS. 16(A)-(B) depict a list of drop rules and a list of security incidents associated with each drop rule, respectively.

FIGS. 17(A)-(C) illustrate procedures for constructing a query against a set of security events received by the network security monitor system and then saving the query as a new correlation rule.

DESCRIPTION OF EMBODIMENTS

The present invention is directed to a method and system of analyzing a stream of security events sent to a network security monitor system by a plurality of network security devices, presenting the analysis result to a user of the system in an intuitive form, and helping the user to develop new network attack detection strategies.

Figure 1:
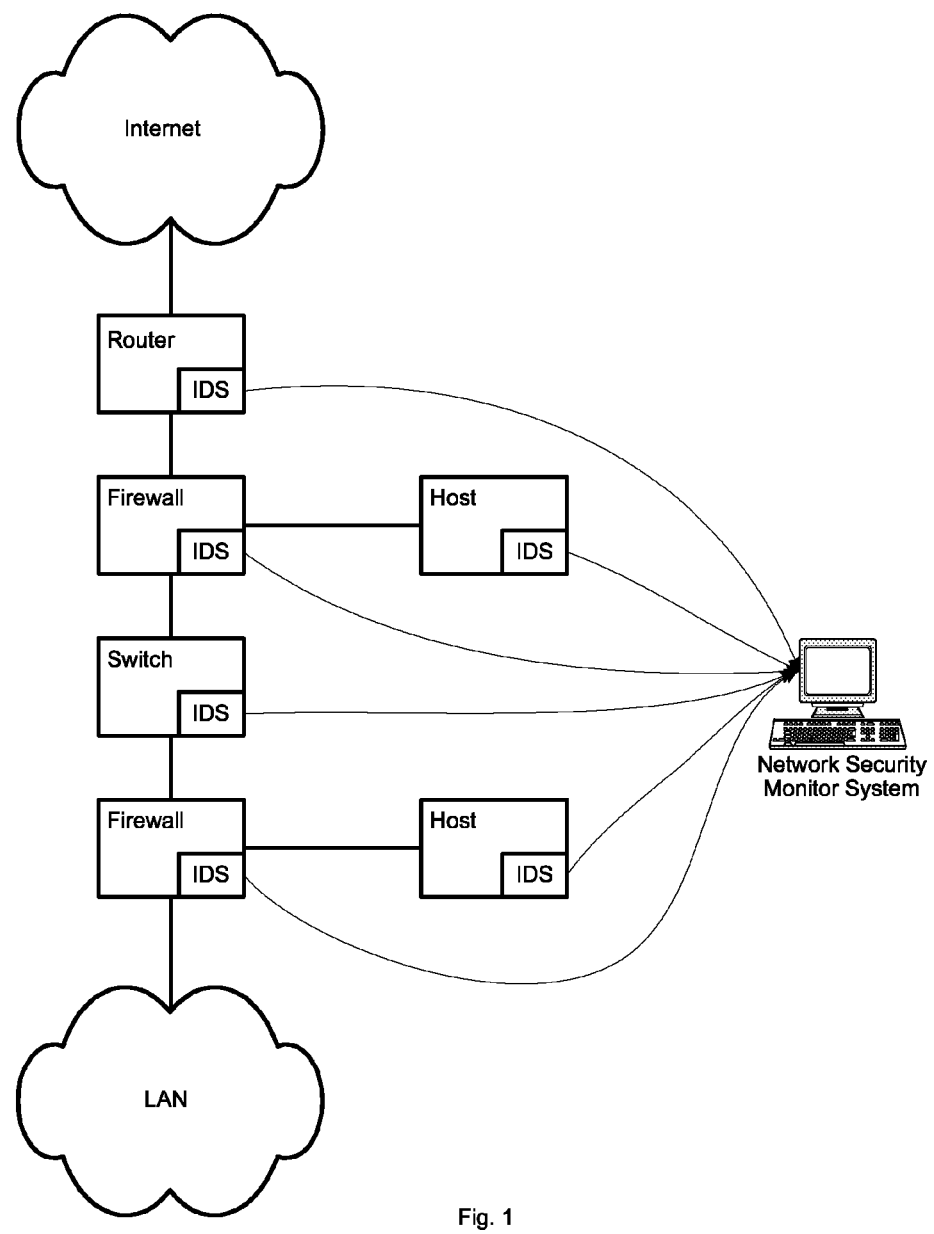
FIG. 1 illustrates a computer network emphasizing the collection of security events from multiple security devices by a network security monitor system.
Figure 2:
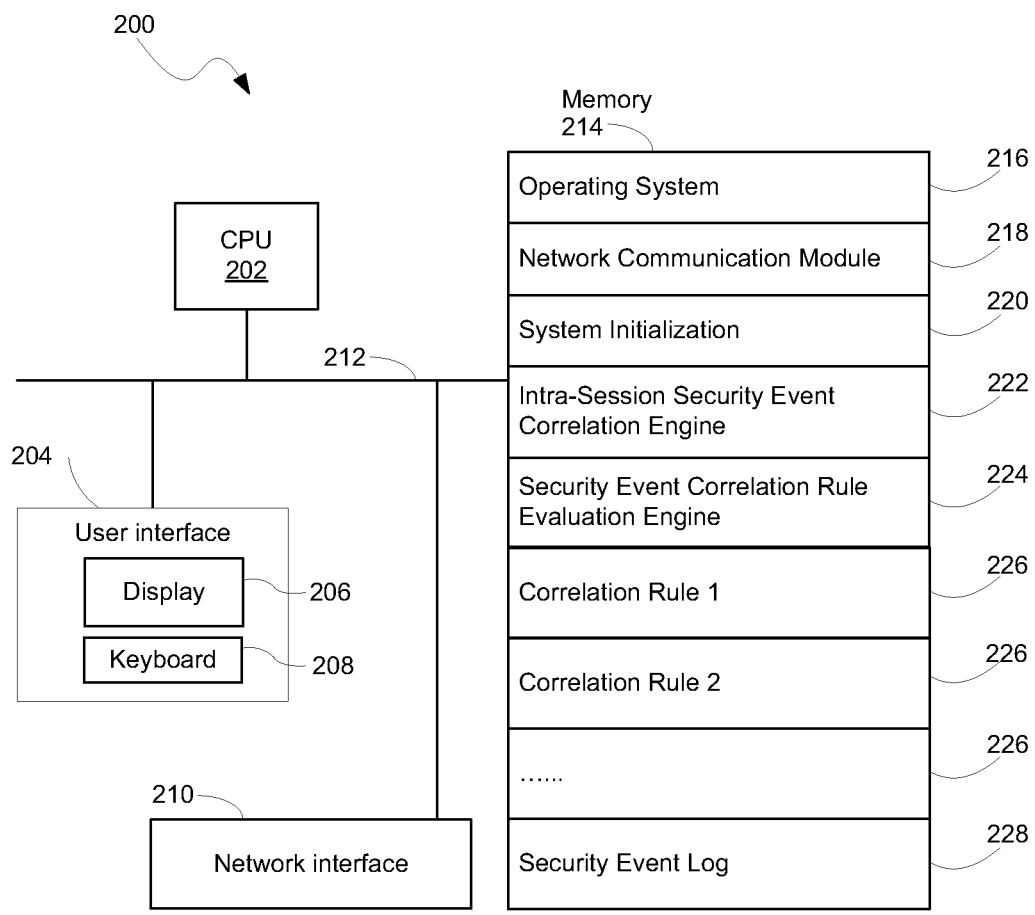
FIG. 2 is a block diagram of a network security monitor system.

FIG. 2 illustrates a network security monitor system 200 used for processing a stream of security events reported by multiple security sensors deployed over a computer network. A network security monitor system 200 typically comprises one or more central processing units (CPU's) 202, a network or other communications interface 210, memory 214, and one or more communication buses 212 for interconnecting various components of the monitor system 200. The network security monitor system 200 also includes a user interface 204, for example, including a display 206 and a keyboard 208.

Memory 214 includes high-speed random access memory and may also include non-volatile memory, such as one or more magnetic disk storage devices (not shown). Memory 214 may also include mass storage that is remotely located from the central processing unit(s) 202. Memory 214 preferably stores:

- an operating system 216 that includes procedures for handling various basic system services and for performing hardware dependent tasks;
- a network communication module 218 that is used for connecting the monitor system 200 to various security devices or client computers (not shown) and possibly to other servers or computers via one or more communication networks (wired or wireless), such as the Internet, other wide area networks, local area networks, metropolitan area networks, and so on;
- a system initialization module 220 that initializes other modules and data structures stored in memory 214 required for the appropriate operation of the monitor system 200;
- an intra-session security event correlation engine 222 for grouping a plurality of incoming security events into different network sessions;
- a security event correlation rule evaluation engine 224 for processing the network sessions according to a set of predefined security event correlation rules;
- a plurality of security event correlation rules 226 designed for different network attack scenarios; and
- a security event log 228 for storing security events received by the monitor system 200.

Figure 3:
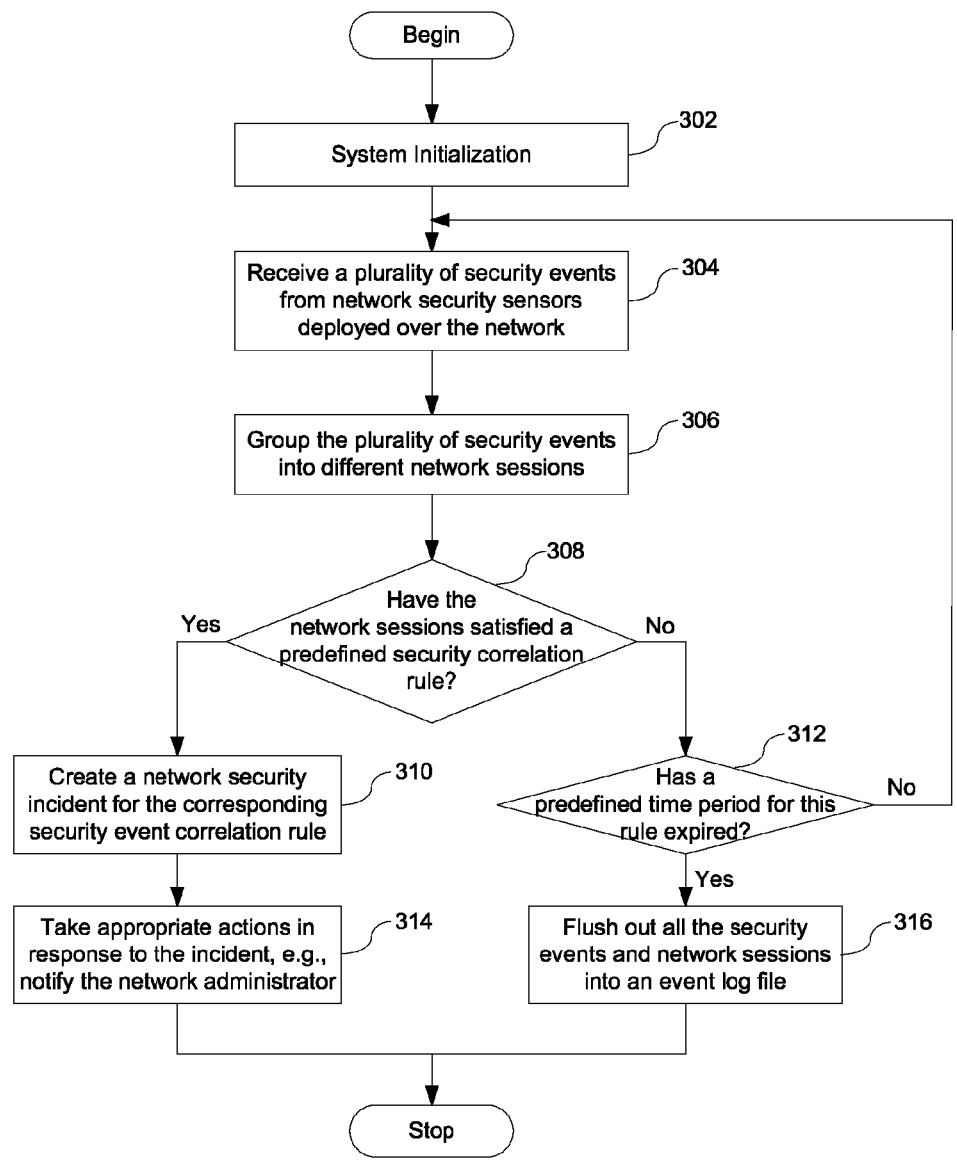
FIG. 3 is a flowchart demonstrating the major steps of the present invention.

FIG. 3 is a flowchart illustrating the major operation steps of a network security monitor system 200 according to one embodiment of the present invention. At step 302, the monitor system conducts necessary system initialization, comprising loading the two engines 222 and 224 and the security correlation rules 226 into the system memory.

At step 304, the monitor system receives a plurality of security events from security sensors deployed over the network and then groups them into different network sessions using the intra-session security event correlation engine 222 at step 306.

At step 308, the monitor system employs the security event correlation rule evaluation engine 224 to check if the network sessions satisfy any predefined security event correlation rule. If true, the monitor system creates a network security incident in response to the rule at step 310 and then takes certain actions to protect the network from attacks at step 314, e.g., notifying the network administrator. If false, the monitor system checks if a predefined time period associated with the security event correlation rule has expired or not. If the time has not expired, the system goes back to step 304, waiting for more incoming security events. If the time has expired, the system flushes out the security events and network sessions from its memory into an security event log file 228 at step 316.

The following discussion is directed to the user interactivity features of the system, to be more specific, how the information of a network attack is presented to a user and how the user adjusts the system to capture newly developed network attack strategies.

Figure 4A:
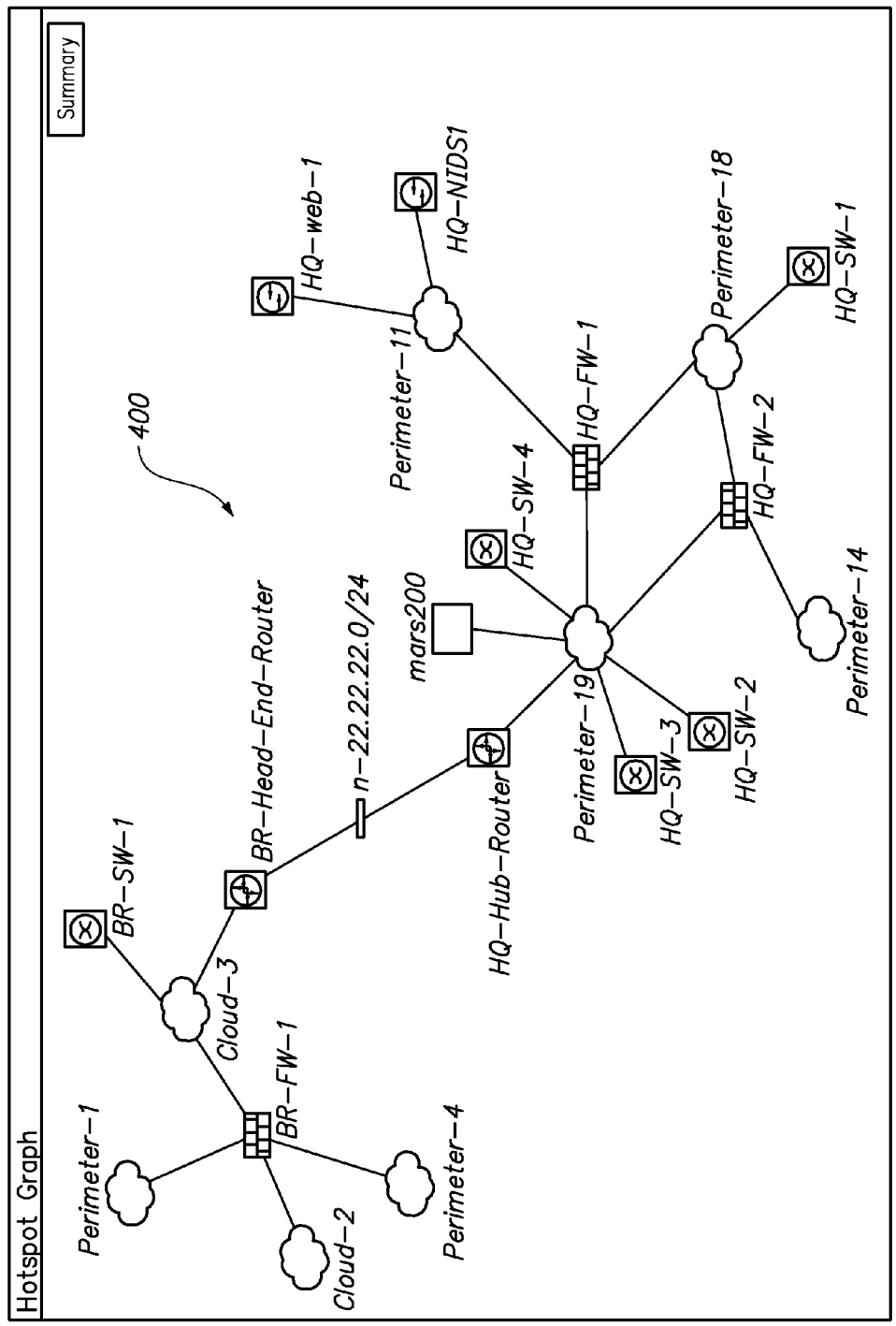
FIGS. 4(A)-(B) are a hotspot and a vector graph of one example according to the present invention, respectively.

As a first step, a user, e.g., a network administrator, logs into a network security monitor system through a network browser, e.g., Internet Explorer (a trademark of Microsoft Corporation), and visits the homepage of the system, as shown in FIG. 4(A). The homepage includes a hotspot graph 400. A hotspot graph provides the user an overview of a network, in particular, graphically depicting various network devices.

The devices shown in hotspot graph 400 can be separated into two categories, security devices and non-security devices. Security devices include firewalls, routers, and network switches. A security sensor, e.g., an intrusion detection sensor, is often attached to a security device for monitoring the network activities going through the device. Non-security devices refer to those devices that do not have security sensors attached. For example, a regular desktop computer that is not equipped with a security sensor is usually a non-security device. Typically, the number of non-security devices on a network is higher than that of security devices.

In one embodiment, each security device, such as a firewall "BR-FW-1" or a network switch "BR-SW-1", is represented by a unique graphical symbol on the hotspot graph 400, which makes it easy to understand the network's topology and to track down the locations of various attacks' sources and destinations. In contrast, a non-security device is usually not represented by a unique symbol, since there are too many of them on a network. Instead, the non-security devices on the network are organized into groups based on their physical locations on the network. Each group is given a unique name and represented by a cloud symbol on the hotspot graph. For example, "Cloud-3" represents a group of non-security devices and is connected to three surrounding security devices, a firewall "BR-FW-1", a network router "BR-Head-End-Router" and a network switch "BR-SW-1".

A security sensor is configured to monitor the network traffic through the security device to which it is attached and submit security events to the network security monitor system. A security event contains information generated by a security sensor in response to certain network activity happening to the network equipment to which the security sensor is attached. For instance, a stream of TCP/IP packets traveling through firewall BR-FW-1 may trigger the security sensor attached to the firewall to submit one or more security events to the monitor system. In one embodiment, a security event comprises a set of event parameters including, but not limited to, a source address, a destination address, a reporting device ID, an event ID, an event type and a timestamp.

Each individual security event, though useful, only provides a snapshot of network activities at a particular security device. Such information is usually insufficient to describe a complicated network attack involving multiple sources, destinations and network routes. Instead, the monitor system is employed to correlate the event parameters of a plurality of security events submitted by different security sensors according to a predefined correlation condition, which is also referred to a security event correlation rule representing a possible scenario of network attack.

However, because of the network address translation (NAT) devices deployed over the network, the source and destination addresses reported by a security event may not be the true source and destination addresses of a network activity that triggers the security event. Therefore, prior to the step of security event correlation, the monitor system needs to "undo" the address translation made by a NAT device and discover the true source and destination of the event, if possible. After that, the system groups the security events into different network sessions. A network session is a group of security events sharing a same set of session qualifiers including, but not limited to, source address, destination address, and network protocol. Therefore, the security event correlation actually happens among "sessionized" security events.

For every set of "sessionized" security events satisfying a security event correlation rule, the network security monitor system generates a security incident comprising the set of "sessionized" security events. In other words, a security incident is defined as a set of security events in association with a plurality of potentially concerted network activities that deserve special attention by the network administrator. A security incident involves at least two parties, a source and a destination. More complicated incidents may involve multiple parties. Each party can be a security device or a non-security device.

In one embodiment, the monitor system highlights a non-security device that has been involved in a security incident by attaching a black dot to a cloud symbol representing a group that includes the device. The number of black dots attached to (or associated with) a device symbol or a cloud symbol serves as an incident volume indicator with regard to a particular security device or group of non-security devices. FIG. 4(A) depicts two black dots, one attached to cloud Perimeter-19 and the other to Perimeter 14, indicating one member from each group has been involved in a security incident, which will be discussed in more detail below.

Figure 4B:
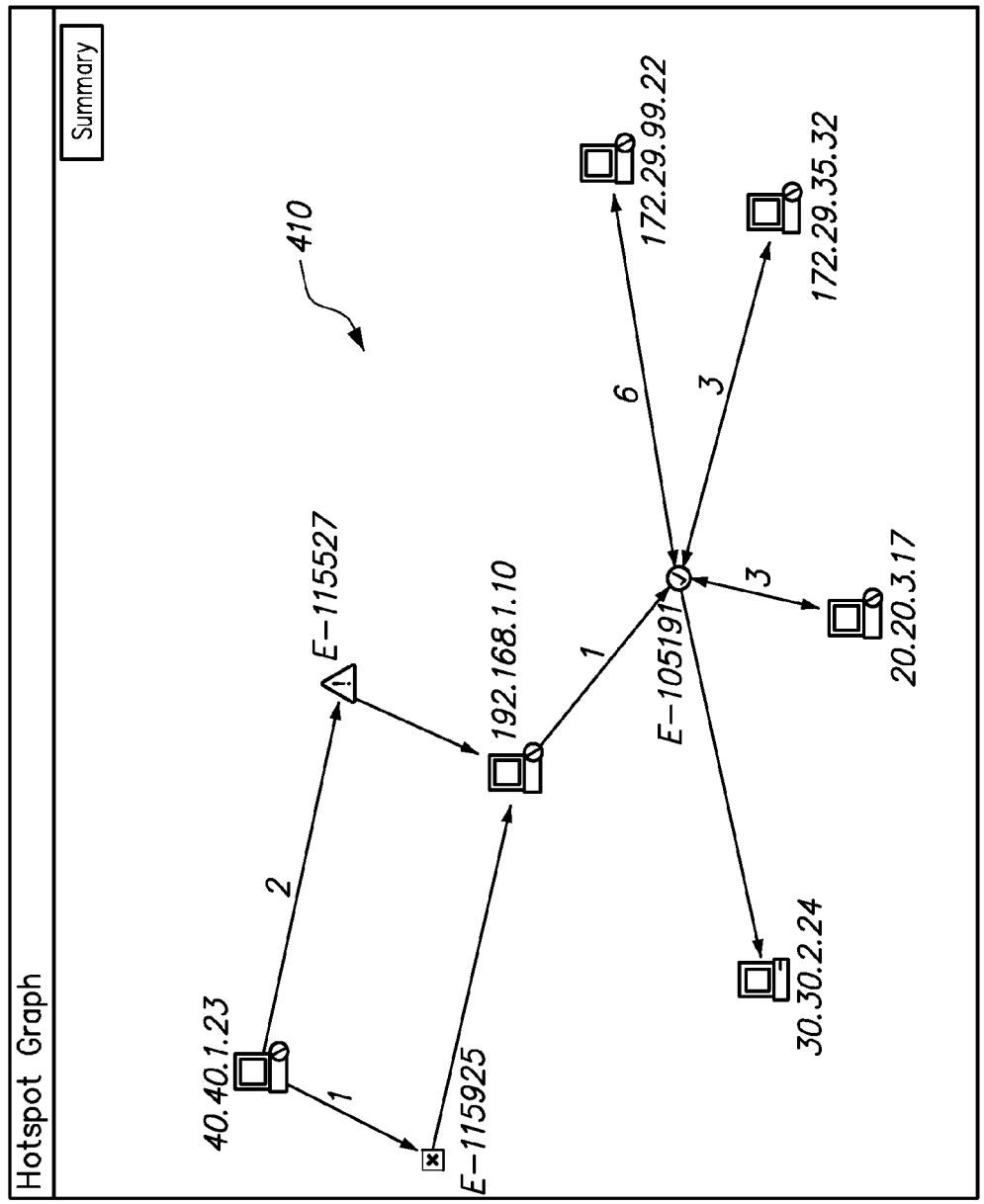

FIG. 4(B) depicts a vector graph 410 that provides a different perspective of the security incidents detected by the monitor system. As discussed above, the hotspot graph indicates which group of non-security devices or security devices are involved in a security incident without identifying the network traffic direction related with a specific incident, e.g., the source and destination of a network session that is part of the incident. In contrast, a vector graph 410 skips those security or non-security devices that do not serve as either source or destination of any network sessions of an incident. The vector graph 410 shows the number of network sessions between any pair of source and destination of an incident. For example, there are a total of three network sessions between source host 40.40.1.23 and destination host 192.168.1.10. The three sessions are split into two groups according to their respective order in the security event correlation rule, one group "E-115925" having one session and the other group "E-115527" having two sessions. More discussion about these network sessions is provided below.

Figure 5A:
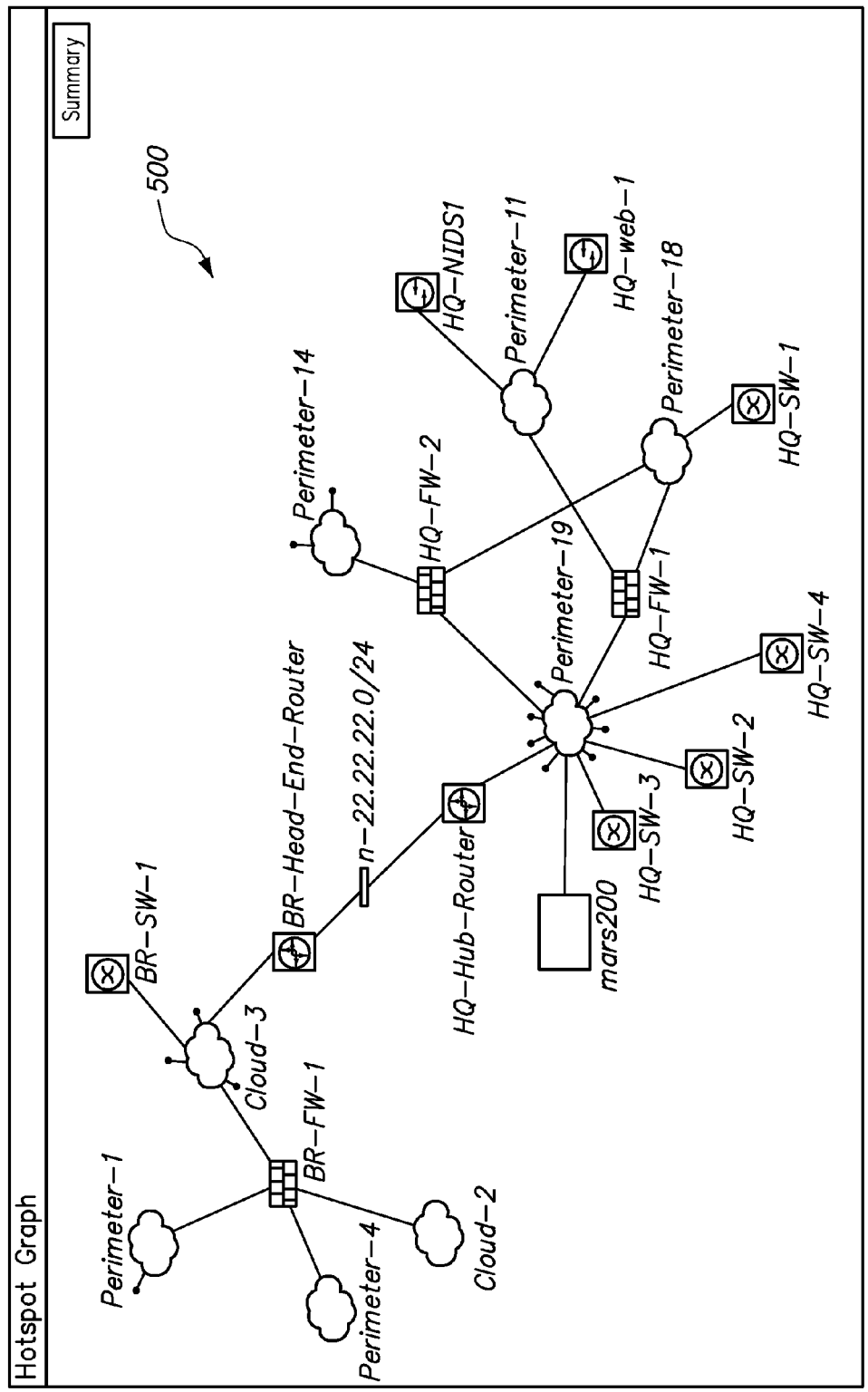
FIGS. 5(A)-(B) are a first-level and a second-level hotspot graph of another example according to the present invention, respectively.

FIG. 5(A) shows a more complex hotspot graph generated by the system after detecting several security incidents during a predefined time period. At least non-security devices from four groups, Perimeter-1, Cloud-3, Perimeter-14 and Perimeter-19, are involved in these incidents and various numbers of black dots are associated with the clouds representing the above-mentioned groups, indicating the extent of involvement of each group. For example, cloud Perimeter-19 indicates that there are seven non-security devices involved in the incidents, serving as sources or destinations in the various network activities. In one embodiment, the monitor system sets an upper limit on the number of black dots on a hotspot graph for a given time period, e.g., three hundred black dots during an hour. Once this limit is reached, the system no longer generates new black dots on the graph until the time period expires, because a hotspot graph having too many black dots may be less intuitive and defeat its original purpose of directing the system user's attention to the "hotspots". In yet another embodiment, different colors are assigned to a cloud symbol to represent how many non-security devices in the group are involved in the security incidents.

Figure 5B:
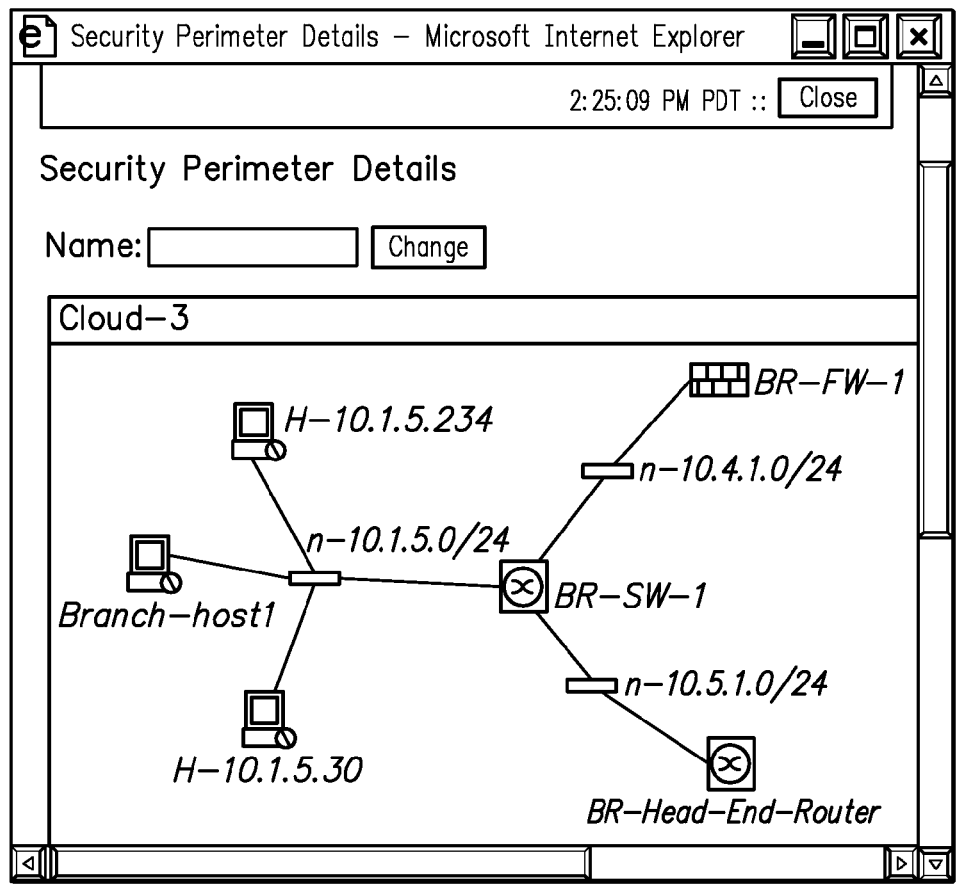

From a hotspot graph, a user is not only able to get an overview of suspicious network activities happening to the network during a predefined time period, but is also able to "zoom" into a particular group, retrieving more details about the non-security devices in the group that have been involved in these network activities. For example, if the user is interested in learning more details about the three non-security devices in the group represented by cloud Cloud-3, he can click on the cloud Cloud-3 in FIG. 5(A), and a new window containing more details pops up as shown in FIG. 5(B). The pop-up window depicts the name of each non-security device and how they are connected with each other as well as other surrounding security devices.

For simplicity, the following discussion focuses on the example shown in FIG. 4(A). In this example, the security incident involves at least two non-security devices (one inside the group represented by cloud Perimeter-19 and the other inside the group represented by cloud Perimeter-14) and some unknown number of security devices. However, the hotspot graph does not tell what kind of role, e.g., source or destination, each device plays in the security incident, what is the traffic route and whether there is any other device involved in the attack. One way to gather this information is to visit a security incident table.

Figure 6:
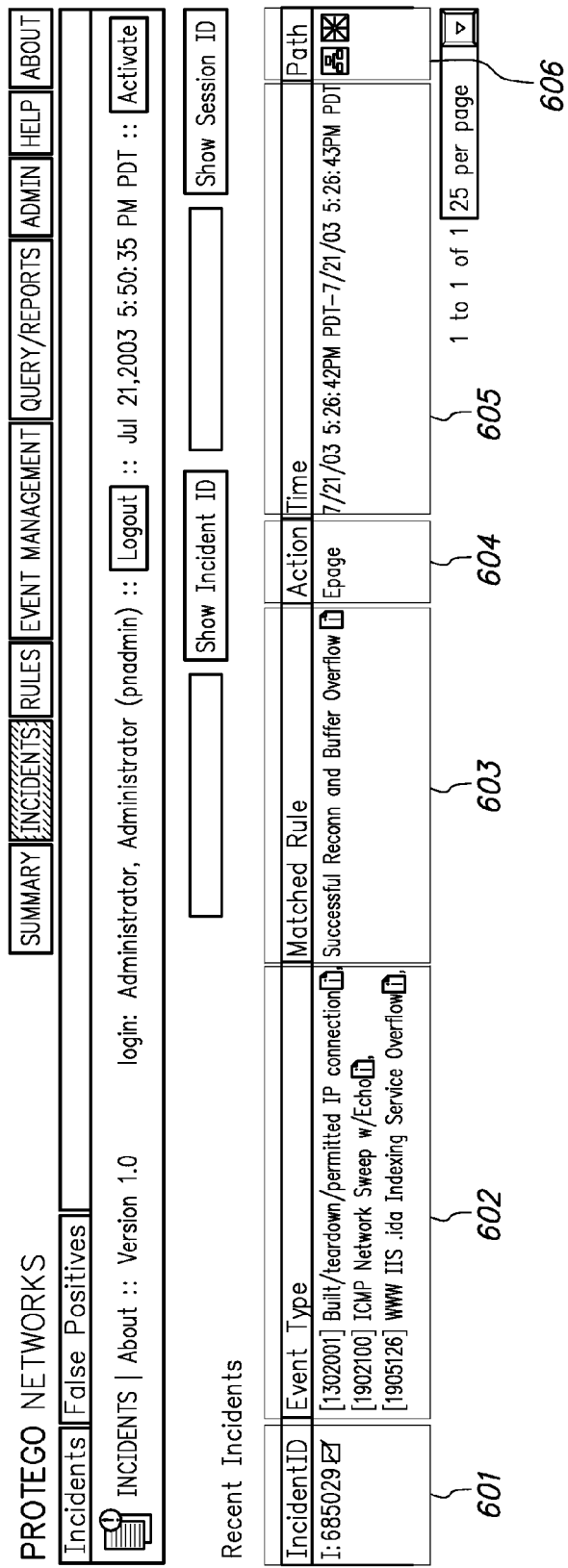
FIG. 6 depicts a security incident table that lists the security incidents happening during a predefined time period.

FIG. 6 depicts a security incident table that lists the security incidents that occur during a predefined time period. In one embodiment, a security incident table comprises six columns The incident ID column 601 stores a unique number for each incident detected by the system and a character "I" is put in front of the number to indicate that it is an incident ID. The event type column 602 contains one or more event types associated with a set of security events that constitute the incident, each type having an expression describing what kind of network activities trigger such a security event. The matched rule column 603 identifies a security event correlation rule associated with the security incident. The action column 604 tells what kind of action has been taken in response to the security incident. The time column 605 stores the time period during which the set of security events are reported by different security sensors. Finally, the path column 606 has two icons, both of which are associated with graphs describing the traffic route of the incident that will be discussed below. To learn more details about the incident, a user can click on the incident ID "685029" in the column 601. In response, the system generates a new web page that contains more details of the incident.

Figure 7:
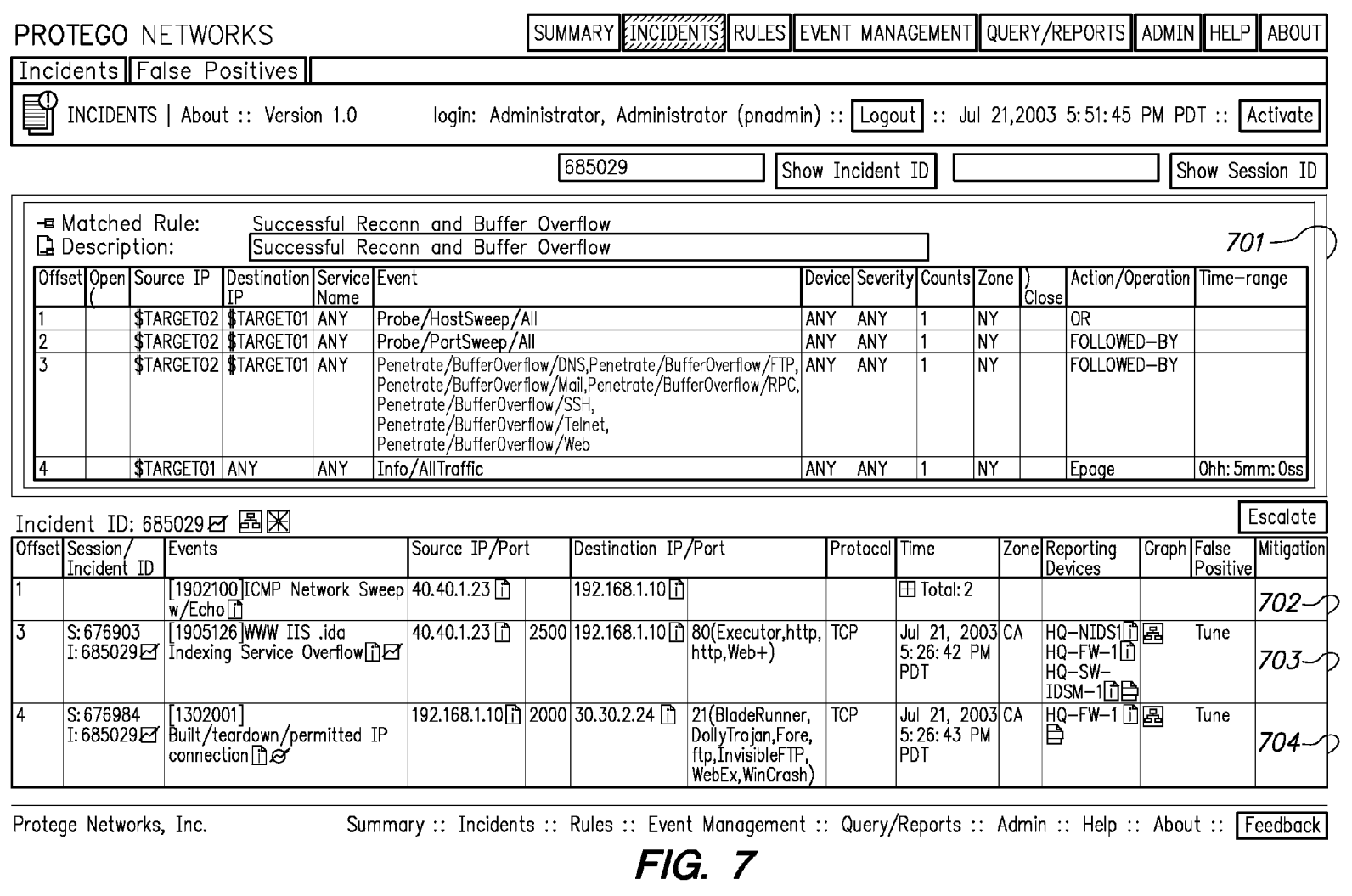

FIG. 7 depicts a web page that contains information of the incident 685029, including the security event correlation rule 701 and a plurality of network sessions 702, 703 and 704. The security event correlation rule 701 is expressed as a table, whose columns are quite self-explanatory according to their names. Each row of the table has a unique number in the offset column that specifies the correlation order between the events associated with this row and the events associated with the row preceding or following this row.

The correlation order can be a logical or temporal order, as indicated by the operators in the action/operation column. For instance, the operator of the first row is a logical OR, which means that the correlation can move onto the third row if there is any security event associated with any of the first two rows. Similarly, the operator of the second row is a temporal FOLLOWED-BY, which means that an event belonging to the first two rows must precede an event belonging to the third tow. By default, the correlation starts from the first row and ends at the last row of the table. However, this order can be adjusted using the open and close parentheses if necessary (see the Open and Close columns of the rule, as shown in FIG. 7).

Each row of the rule includes a "Counts" column or field that specifies a number of security events that must satisfy the constraints of the row before the row is considered to be satisfied. When the Count is equal to one, just one security event that meets the constraints of the row is required. When the Count is equal to two or more, the specified number of such events is required.

Besides the correlation order, another important aspect of the security event correlation rule is to correlate the sources and destinations of different security events to discover a series of concerted network activities that constitute a network attack. As an example, a network attack could be a series of network activities launched by a hacker from one or more devices to attack some targeted devices for the purpose of either destroying the data stored in the targeted devices or illegally transmitting the data from the targeted devices to the devices designated by the hacker.

Each security event includes the information of the source and destination of a particular network activity. Depending on the direction of network traffic, the source of the network activity may be the device that initiates the attack or the device that is under attack. As a result, the source IP and destination IP columns of one or more rows of a rule may be populated with variables. In some embodiments, variables are represented by text strings starting with a dollar sign "$", e.g., $TARGET01, to represent a host address. The advantage of such expression is that the same variable can be re-used in different rows to link them together according to a predefined order. For example, the variable $TARGET01 in the first three rows representing the destination of the corresponding security events becomes the source of the security events in the last row, indicating that the rule is satisfied only when the source of a packet satisfying row 4 of the rule is the same as the target of the packets satisfying row 1 through 3 of the rule.

Finally, there may be a temporal constraint over the correlated security events specified by the time-range column. In the example shown in FIG. 7, the time-range column of the security event correlation rule 701 has only one entry 0hh:5 mm:0ss in the last row, meaning that the time gap between the first and last security events that satisfy this correlation rule should be no more than five minutes for the correlation rule to be satisfied.

In the lower part of FIG. 7 is a table of network sessions associated with the security incident 685029 that have satisfied the security event correlation rule shown in the upper part of FIG. 7. The two tables share similar structure. Four network sessions are listed, each network session having a unique ID and associated with one offset of the rule. For example, network session 676903 is associated with offset 3 and network session 676984 with offset 4. Note that the sessions associated with offset 1 have been compressed into one row and there is a plus sign button in the row next to the expression "Total: 2", indicating that there are another two network sessions associated with offset 1 and the user can expand the table by clicking on the plus sign.

FIG. 8 depicts the expanded list of network sessions that include the two sessions associated with the offset 1 after the user clicks on the plus sign. The security events associated with the two network sessions are almost identical except that they are reported by different devices. The security event of network session 676852 is reported by the security sensor HQ-SW-IDSM-1 and the security event of network session 676853 is reported by the sensor HQ-NIDS1, both of which can be located on the hotspot graph in FIG. 4(A). Note that the entries under columns such as events, source IP and destination IP include an information icon. A user can click on these icons to retrieve more details about that entry.

Figure 9:
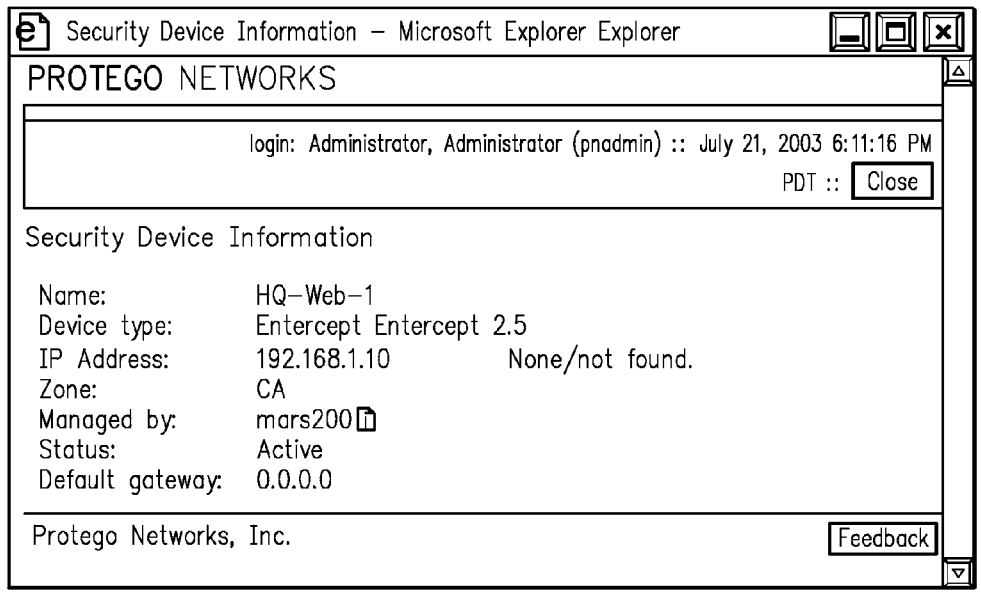
FIG. 9 depicts a pop-up window including details of a destination host of a network session.
Figure 10:
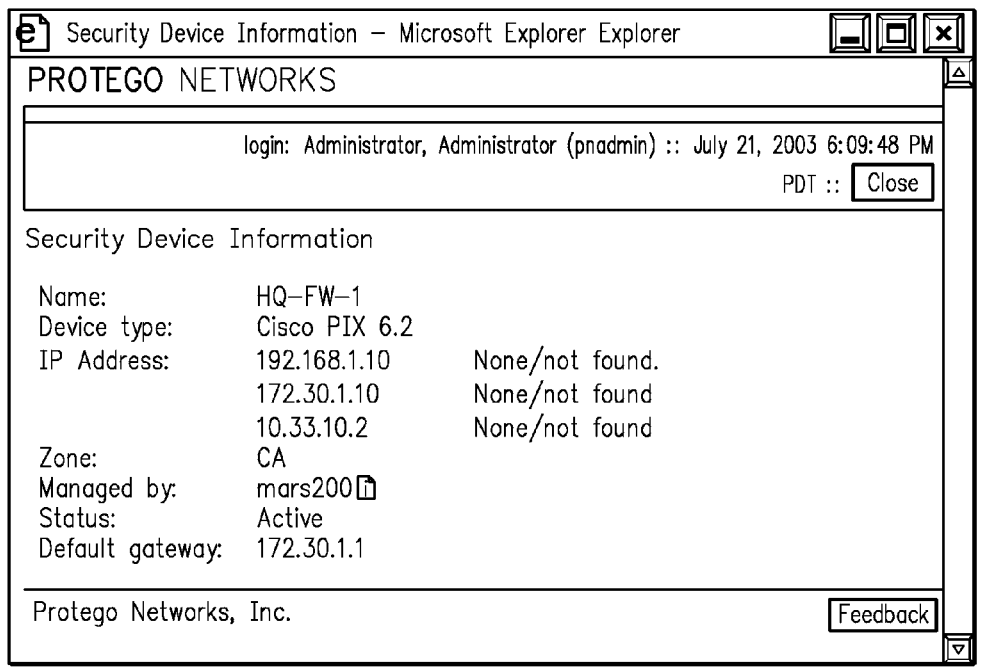
FIG. 10 depicts a pop-up window including details of a security device, e.g., a firewall.

For example, if a user clicks on the information icon next to the IP address 192.168.1.10 in the first row, a window pops up as shown in FIG. 9, providing more details about the device serving as the destination of multiple network sessions, such as name, device type, geographic zone, manager of the device, status, and default gateway. Similarly, FIG. 10 depicts more details about a security device HQ-FW-1 that reported the security events of network session 676984.

Besides learning more about each device related with the network sessions, a user can also gain more insight into each security event belonging to one of the network sessions, such as the raw message reported by a security sensor and the traffic route of the suspicious network activities, etc.

Figure 11A:
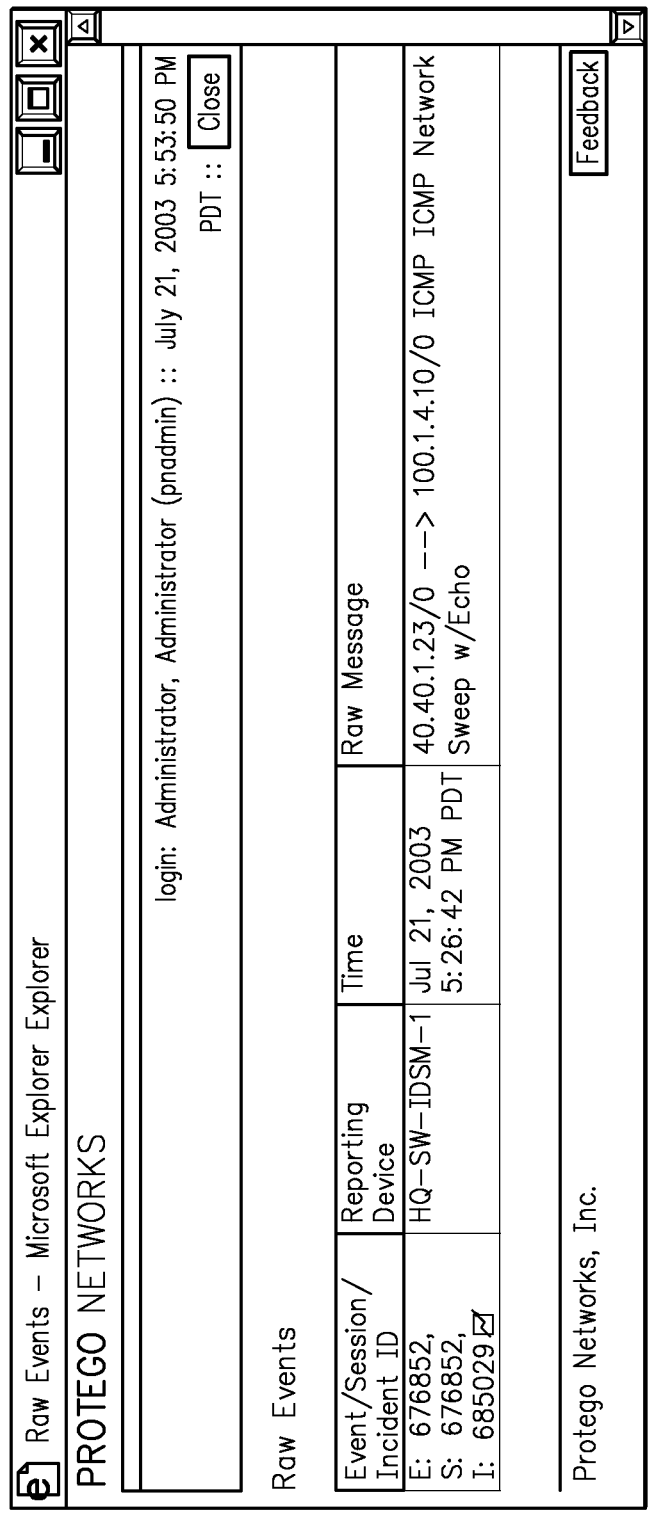
FIGS. 11(A)-(C) depict a set of security events, a local hotspot graph and a local vector graph associated with a network session 676852, respectively.

FIG. 11(A) depicts a pop-up window that includes the security events grouped under network session 676852 (in this case, there is only one event 676852 reported by security sensor HQ-SW-IDSM-1). The raw message of event 676852 indicates that the event's source address is IP 40.40.1.23/0, the destination address is IP 100.1.4.10/0 and the event type is "ICMP Network Sweep w/Echo". Note that the destination address in the raw message is different from the corresponding destination address in the network session table, which is 192.168.1.10. As will be explained below, this difference is caused by a NAT device.

Figure 11B:
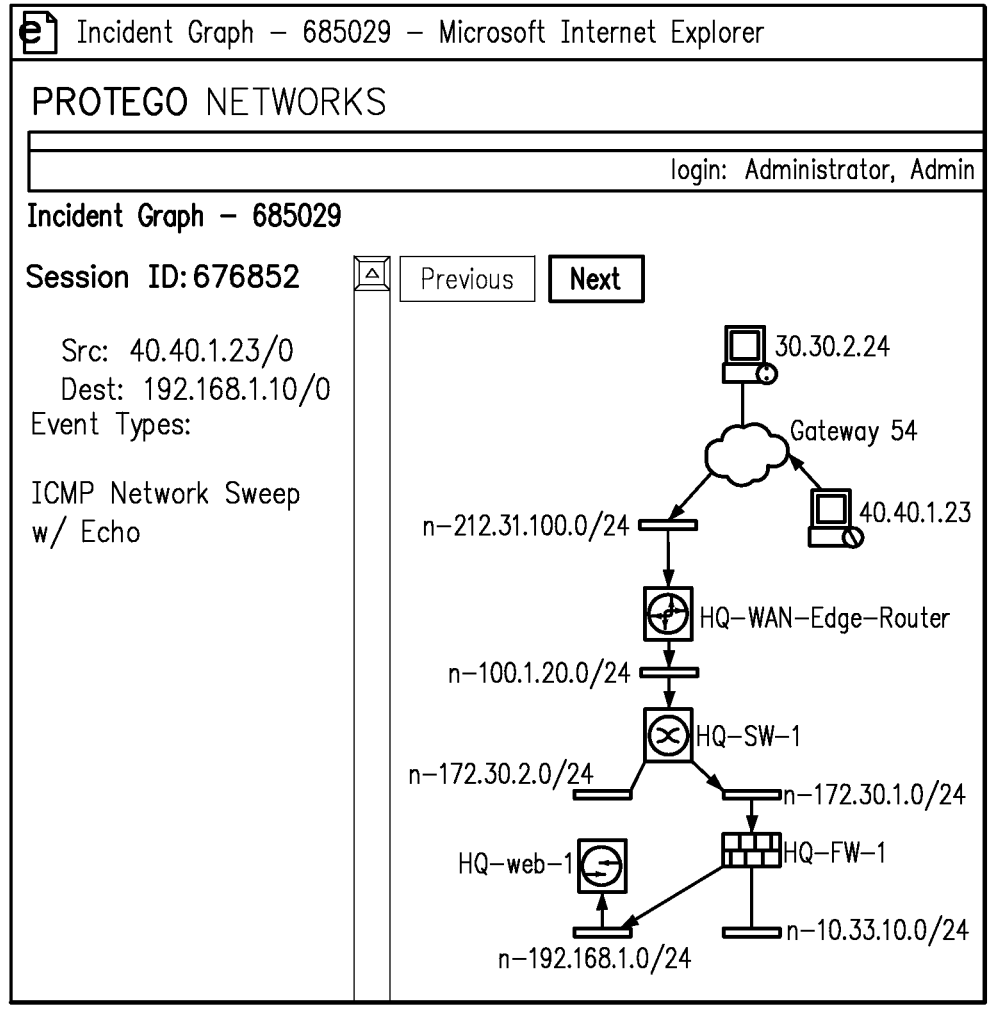

FIG. 11(B) depicts a pop-up window including a local hotspot graph in association with network session 676852. According to the local hotspot graph, the security event 676852 is reported by the security sensor HQ-SW-IDSM-1 attached to the network switch HQ-SW-1 in response to the network traffic indicated by a series of arrows from the source address 40.40.1.23/0 to the destination address HQ-Web-1 or 192.168.1.10.

Figure 11C:
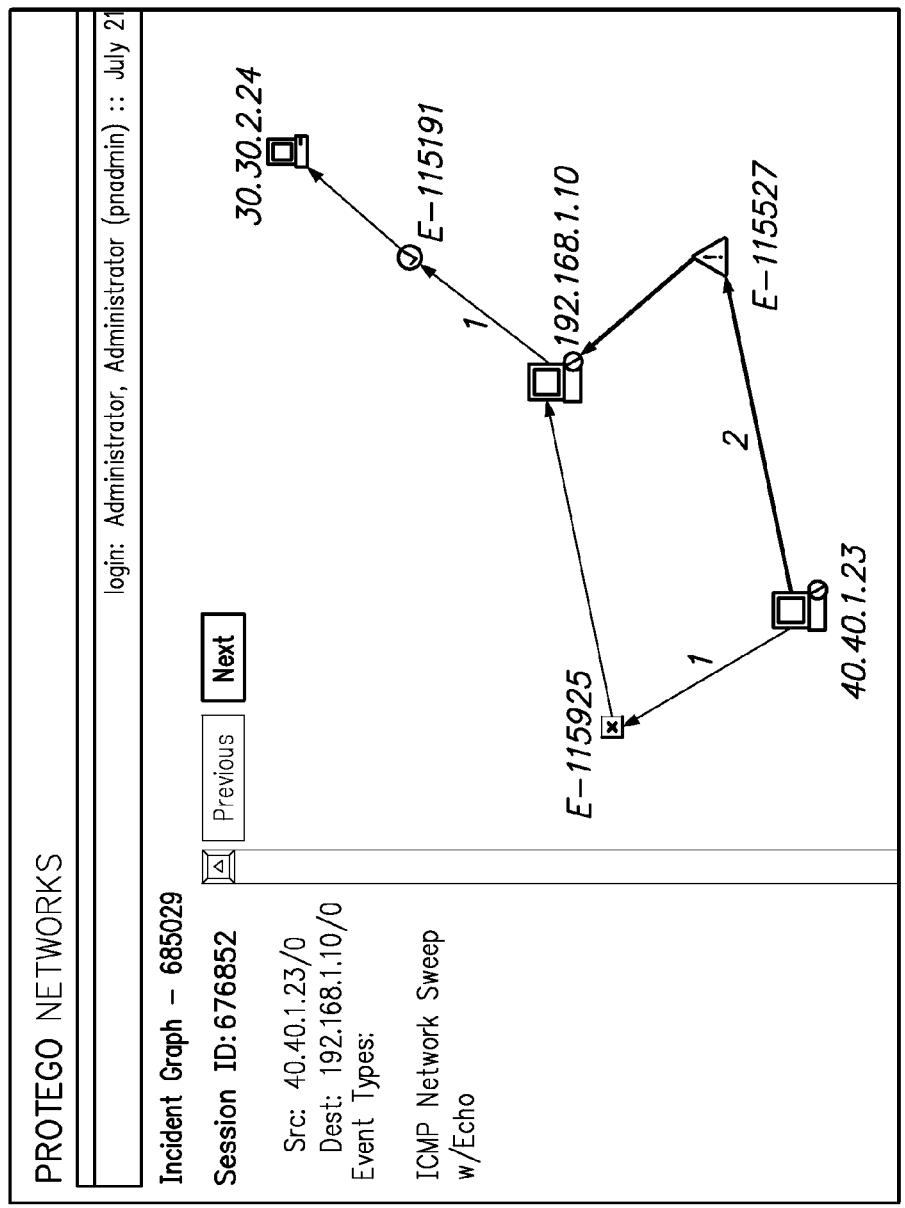

FIG. 11(C) depicts another pop-up window including a local vector graph in association with network session 676852. As discussed above, the local vector graph is an abstractive expression and its purpose is to visualize network session 676852 between its source address 40.40.1.23 and destination address 192.168.1.10. Therefore, the devices along the route appearing in the local hotspot graph of FIG. 11(B) have disappeared from the local vector graph. The local vector graph here shows that network session 676852 is one of the two sessions having offset 1 from the source address 40.40.1.23 to the destination address 192.168.1.10.

Figure 12A:
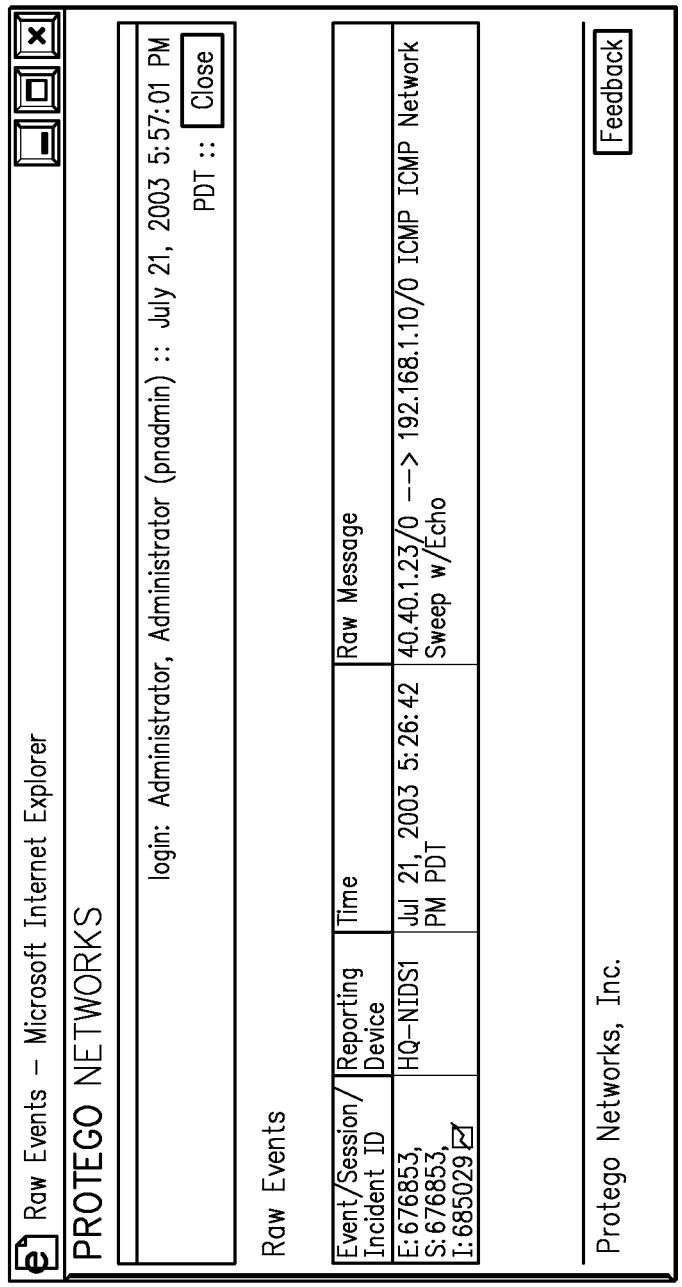
FIGS. 12(A)-(C) depict a set of security events, a local hotspot graph and a local vector graph associated with a network session 676853, respectively.
Figure 12B:
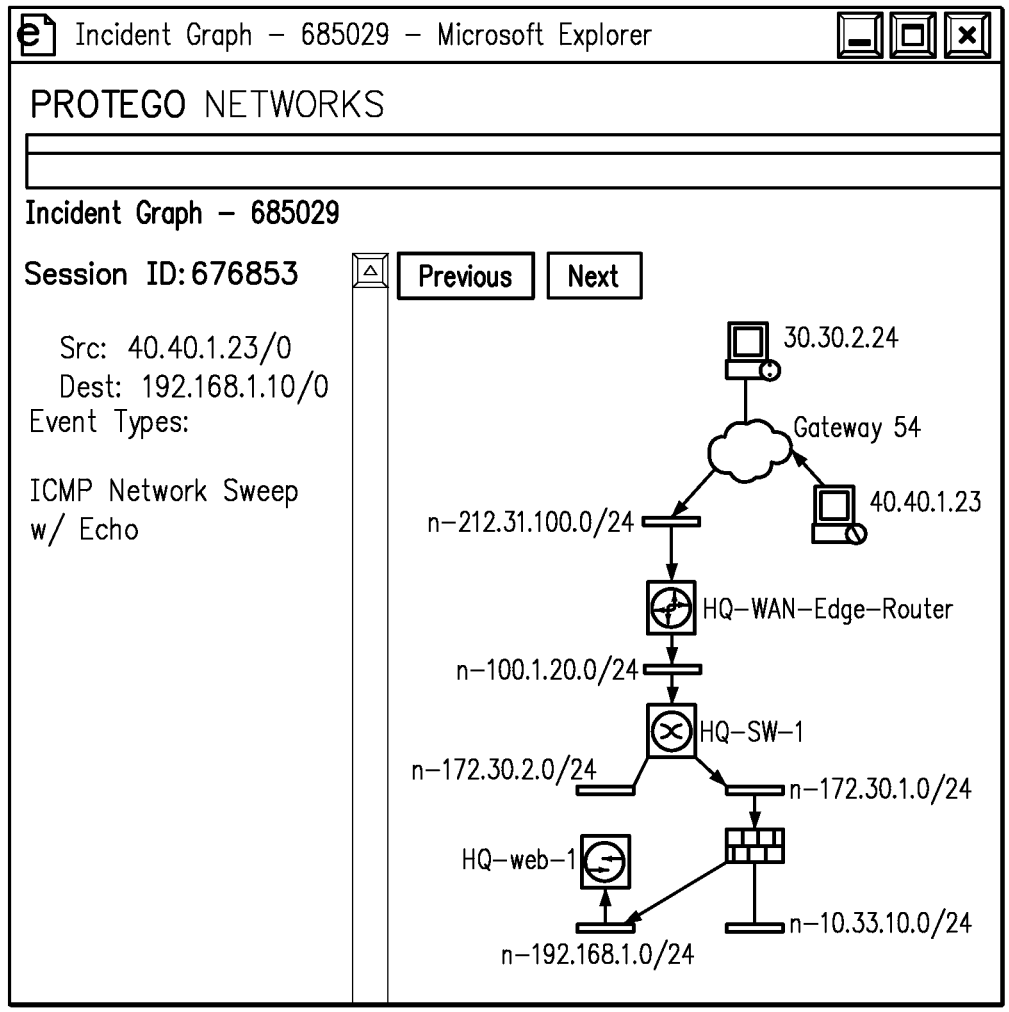
Figure 12C:
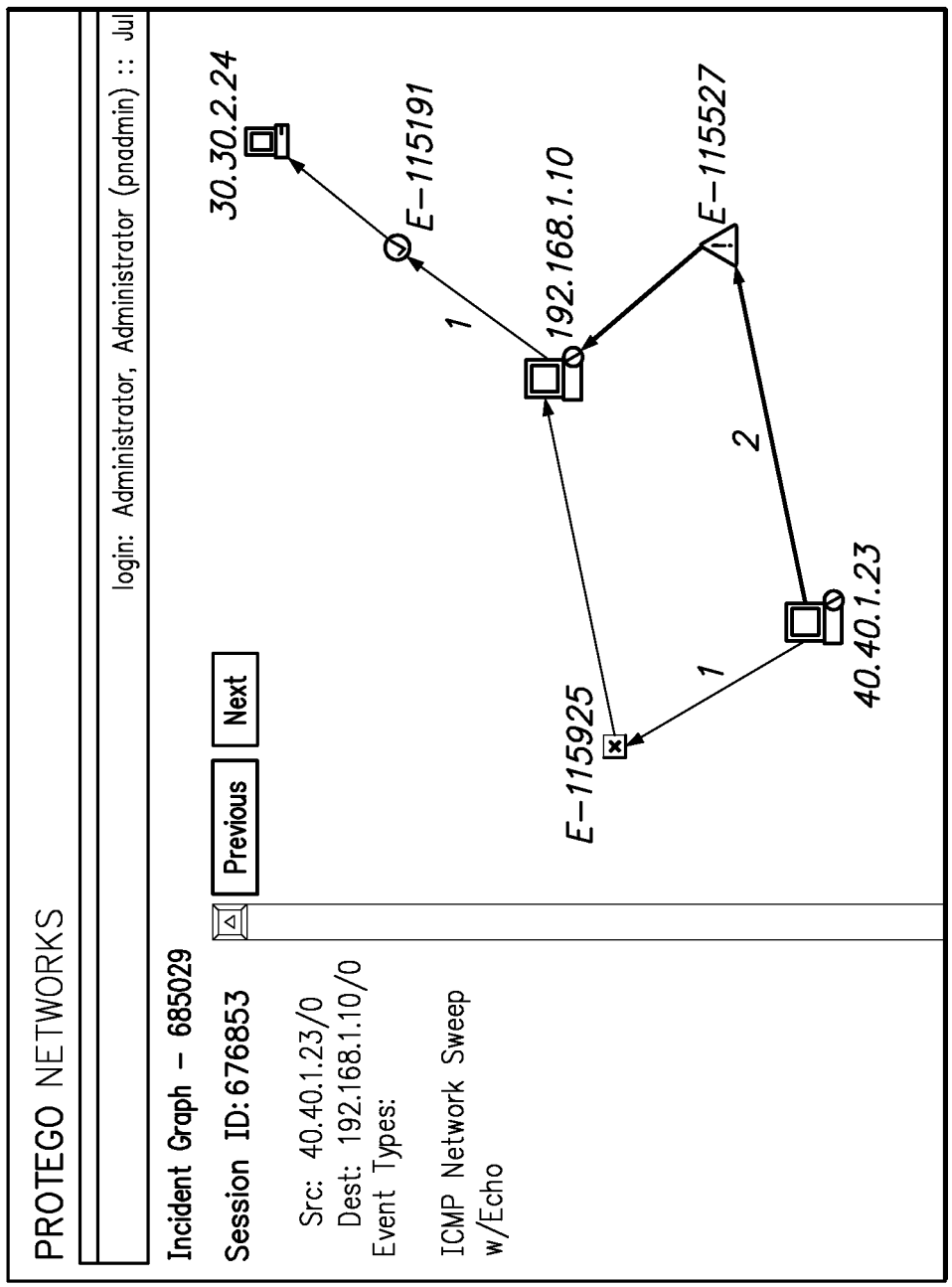

FIG. 12(A) depicts the security events associated with network session 676853 (in this case, there is still only one event 676853). FIGS. 12(B) and 12(C) depict the local hotspot and vector graphs of the network session 676853. Since both of the two network sessions 676852 and 676853 share the same source, destination and offset value, these two graphs are identical to their counterparts of network session 676852.

Figure 13B:
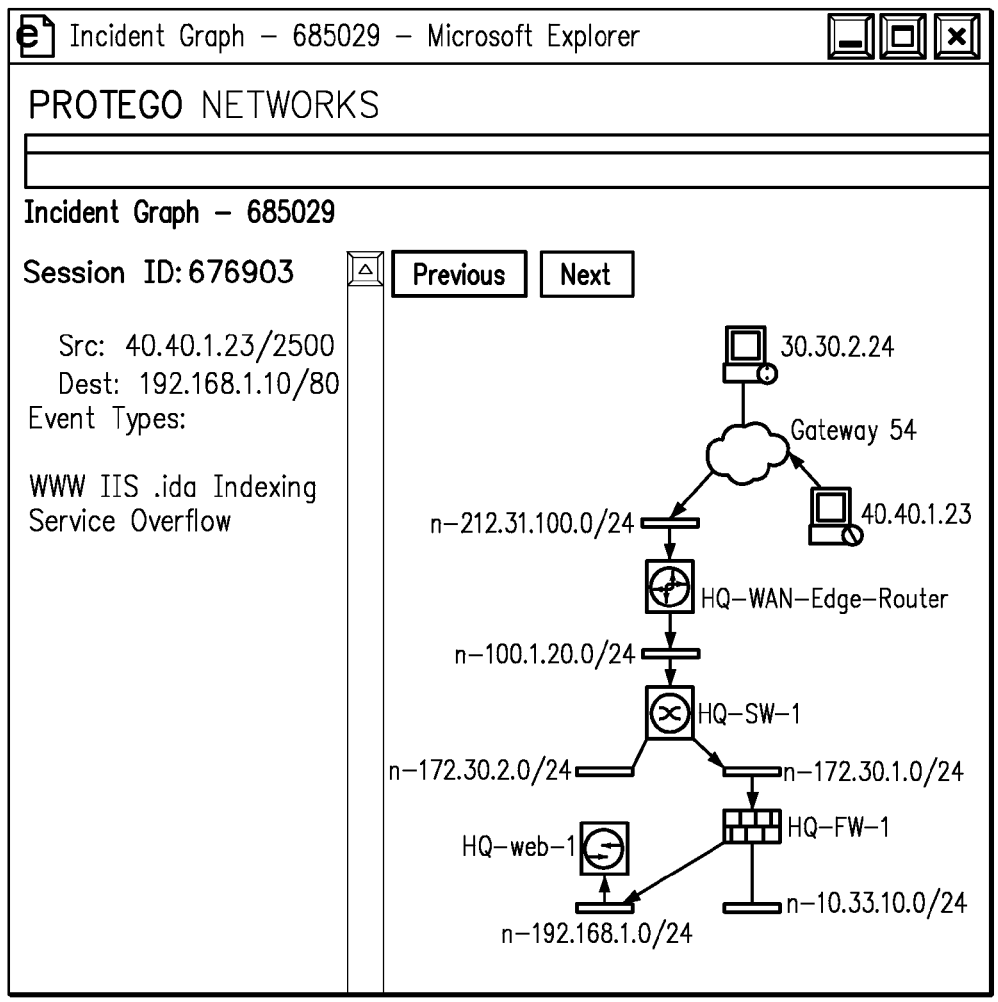
Figure 13C:
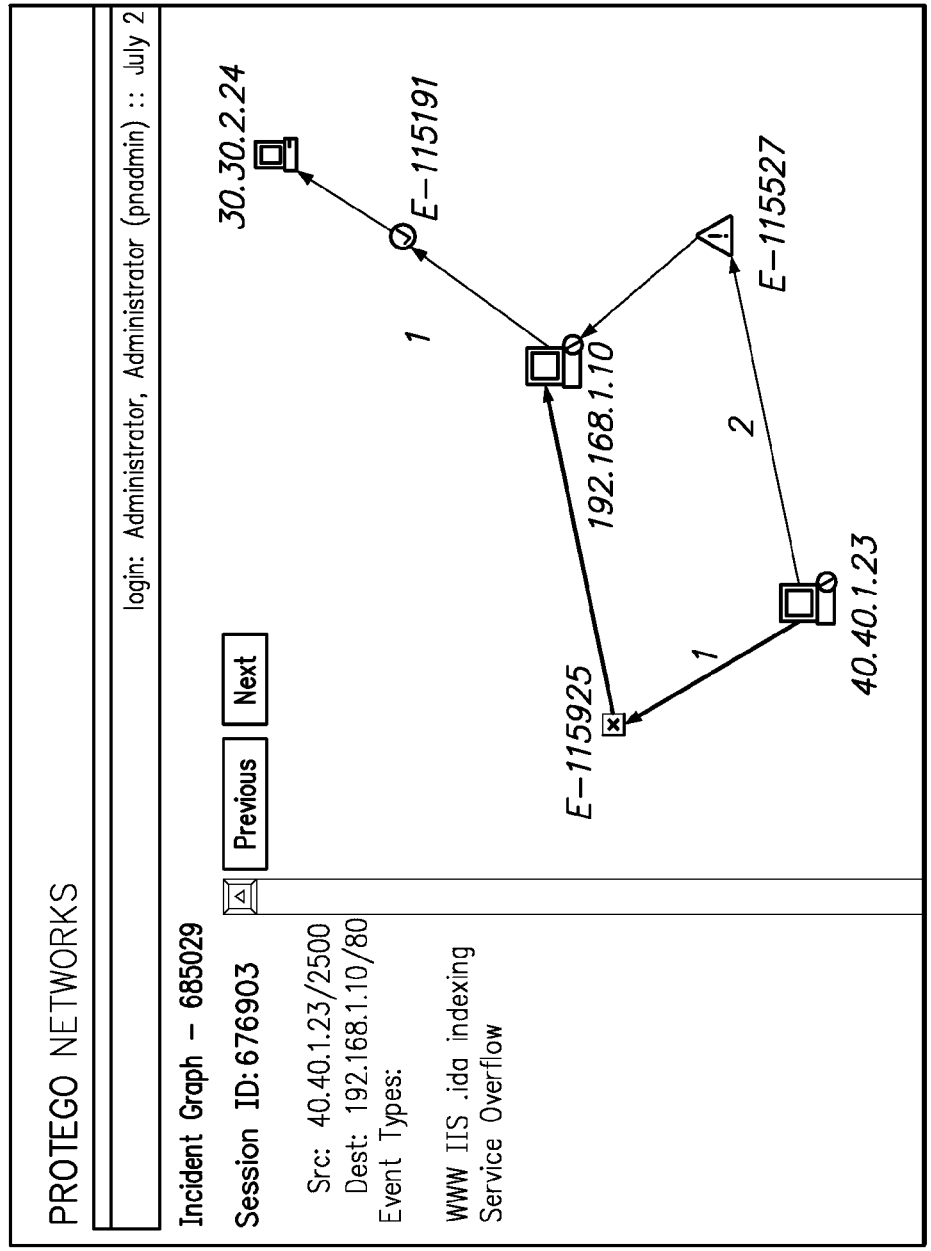

FIG. 13(A) depicts the security events associated with network session 676903. Network session 676903 comprises five security events reported by multiple security sensors. Some sensors like HQ-NIDS1 are on one side of a NAT device and some are on the other side. This is why the destination address is 100.1.4.10/80 in the raw message of security event 676900 and 192.168.1.10/80 in the raw message of security event 676904. Even though the local hotspot graph of network session 676903 is the same as the other two, its local vector graph is different this time because network session 676903 has a different offset value 3.

Figure 14A:
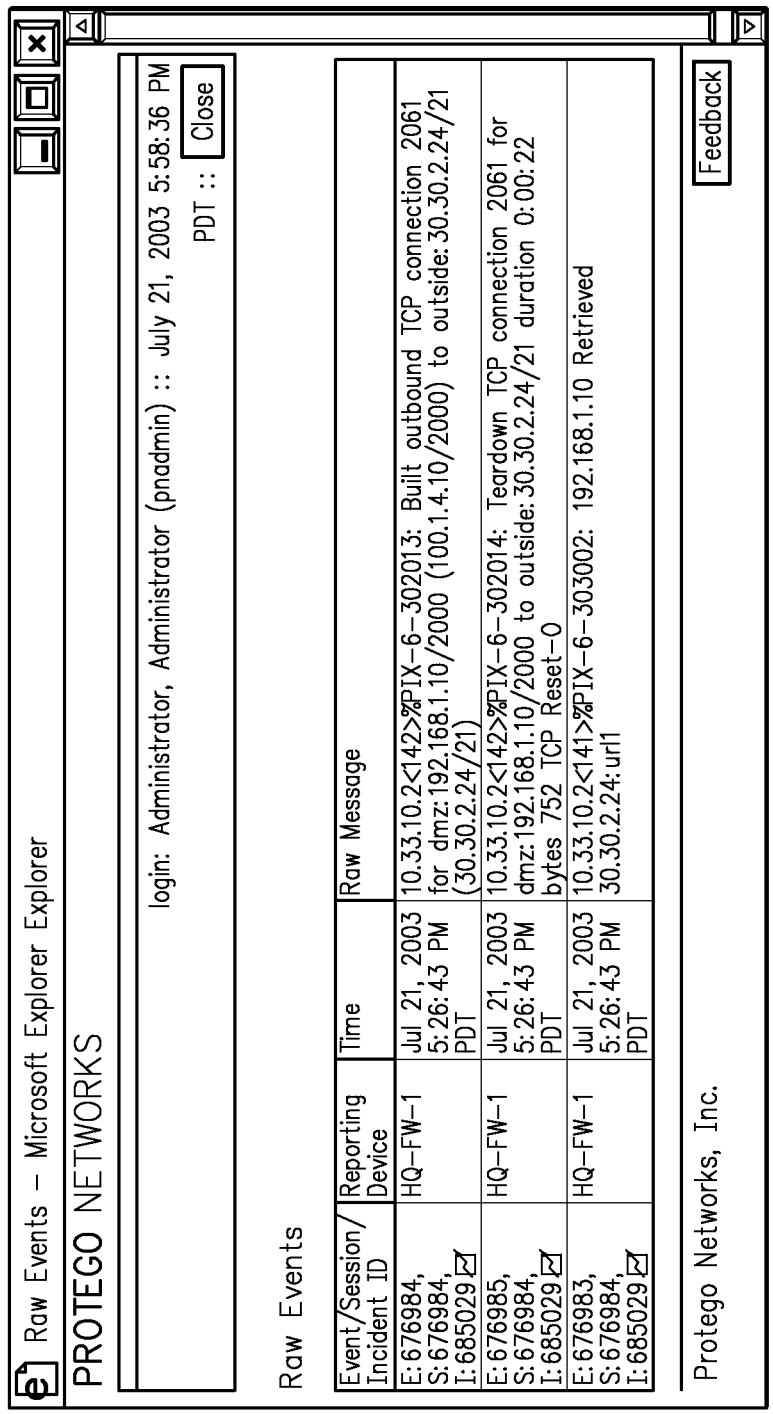
FIGS. 14(A)-(C) depict a set of security events, a local hotspot graph and a local vector graph associated with a network session 676984, respectively.
Figure 14B:
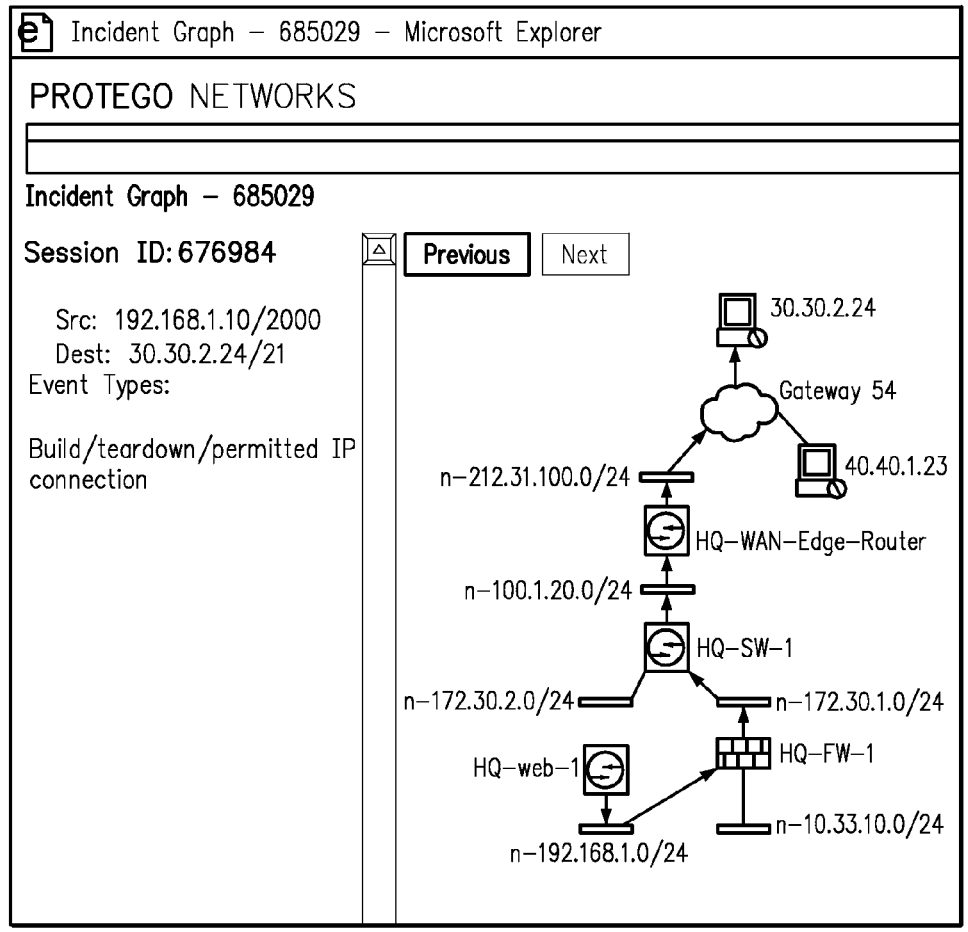
Figure 14C:
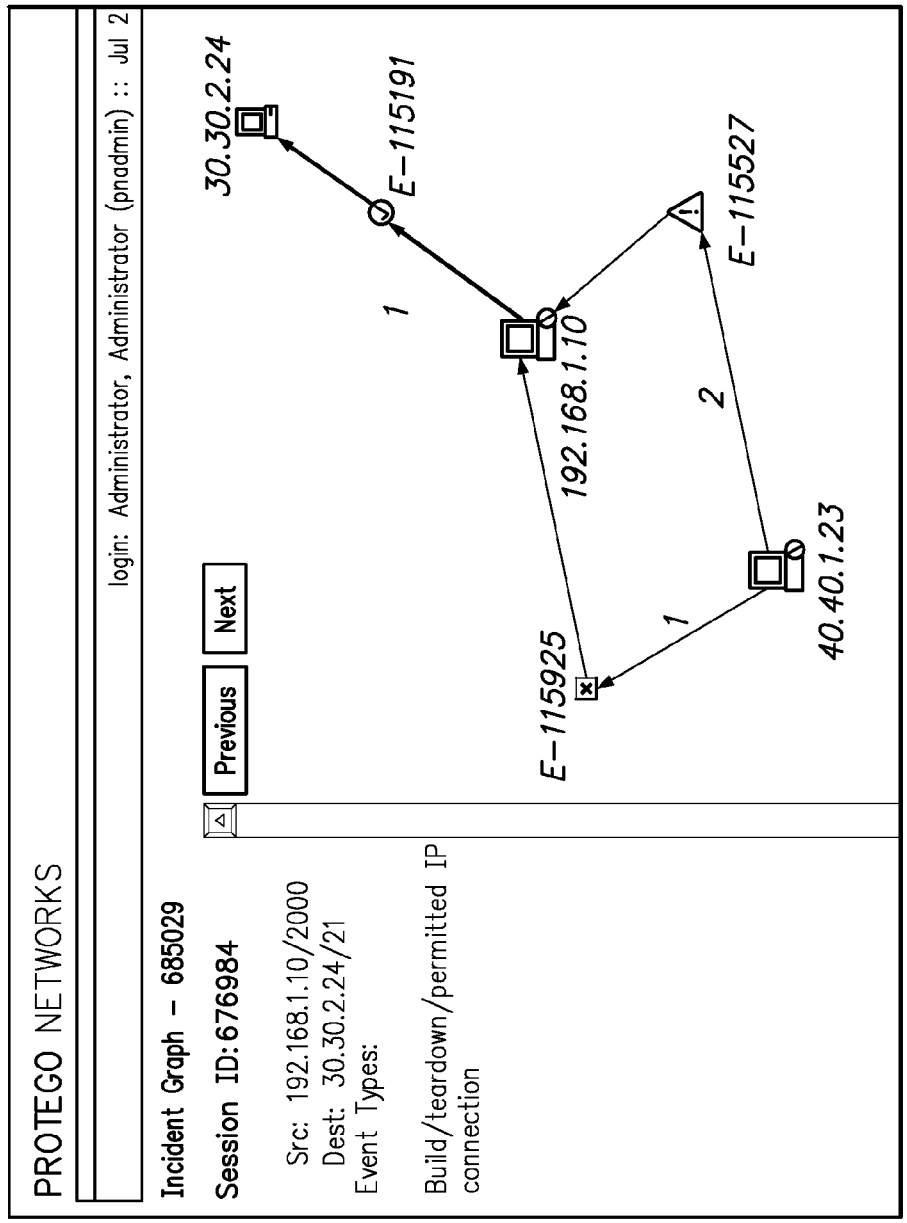

Finally, FIG. 14(A) depicts the three security events associated with the network session 676984, which are reported by the security sensor attached to the firewall HQ-FW-1. FIG. 14(B) depicts a local hotspot graph including the network traffic route starting at the device HQ-Web-1 and ending at the device 30.30.2.24, and FIG. 14(C) depicts a network session 676984 between device 192168.1.10 or HQ-Web-1 and device 30.30.2.24.

As discussed above, some network sessions may comprise only one security event, such as network sessions 676852 and 676853, and some may comprise multiple events, such as sessions 676903 and 676984. In the first case, the only security event in a network session must have satisfied the requirements stipulated in a corresponding row of the security event correlation rule. Such event is also referred to as the trigger event. In the second case, there is also at least one trigger event within a network session. However, some of the non-trigger events in the network session may not completely satisfy the requirements. As a result, these events are highlighted in the network session list by attaching a question mark icon to each of them, as explained in more detail below.

Figure 15A:

FIG. 15(A) shows another security incident 685008's network session list and a pop-up window. The network session 675271 at offset 1 has multiple security events. Two of them include a question mark icon at the end, suggesting that even though these events are not the trigger event, they may still be suspicious enough to be listed here. A user of the system can decide whether or not to keep these events in the session through further investigation.

The pop-up window in FIG. 15(A) provides more information, explaining why one of the two events associated with session 675271 has a question mark. For example, an attack type "IIS Dot Dot Crash Attack" is valid when the destination of an event satisfies three requirements: (a) Operating System is Windows NT 4.0, (b) Application is Internet Information Server (IIS) 2.0, and (c) Protocol is TCP. In this example, the destination of the event is actually running Microsoft IIS 5.0 on an operating system of Windows 2000.

Since the operating system of the security event's destination is not Windows NT 4.0, this security event may be a false positive and any future events like this one will probably not appear in the network session list. However, the user has the final word about whether an event like this one is a false positive and how it should be treated even if it is a false positive. If the user thinks it is useful to keep this type of events in the network session list, he clicks on the Cancel button in FIG. 15(A) and the system will treat this type of security event in the same manner in the future. Otherwise, the user needs to instruct the system to create a special rule, a drop rule, which tunes out any future security events of this type.

Figure 15B:
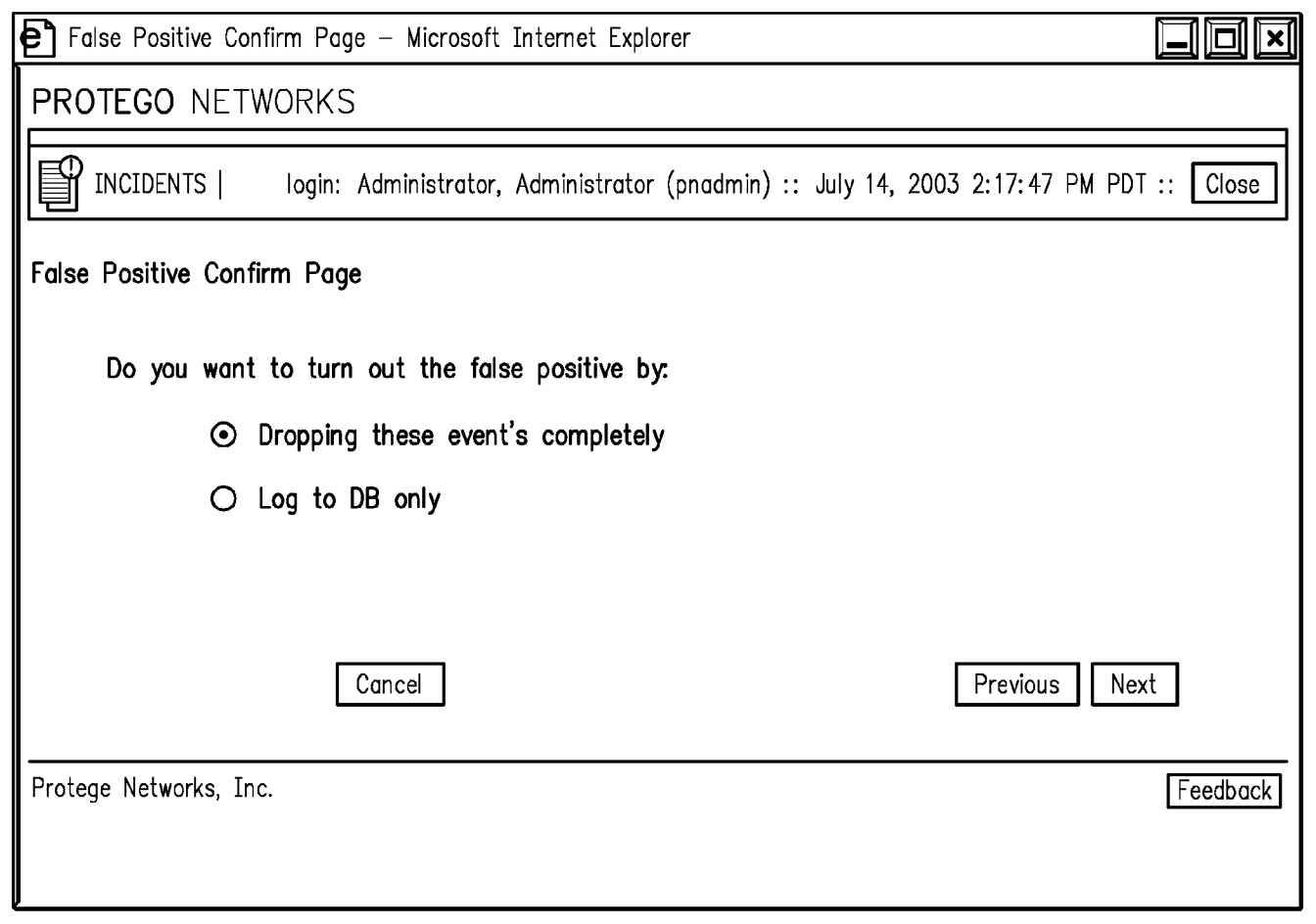

FIG. 15(B) depicts one of the instructions that the user needs to provide to the monitor system to create a drop rule corresponding to a false positive event. Even if a security event having one particular set of event parameters is defined as a false positive, the user may still want to save it in a log file or database for future reference. However, the default option is to drop the security event completely whenever it arrives at the system in the future to save the computer resources for other use.

Figure 15C:
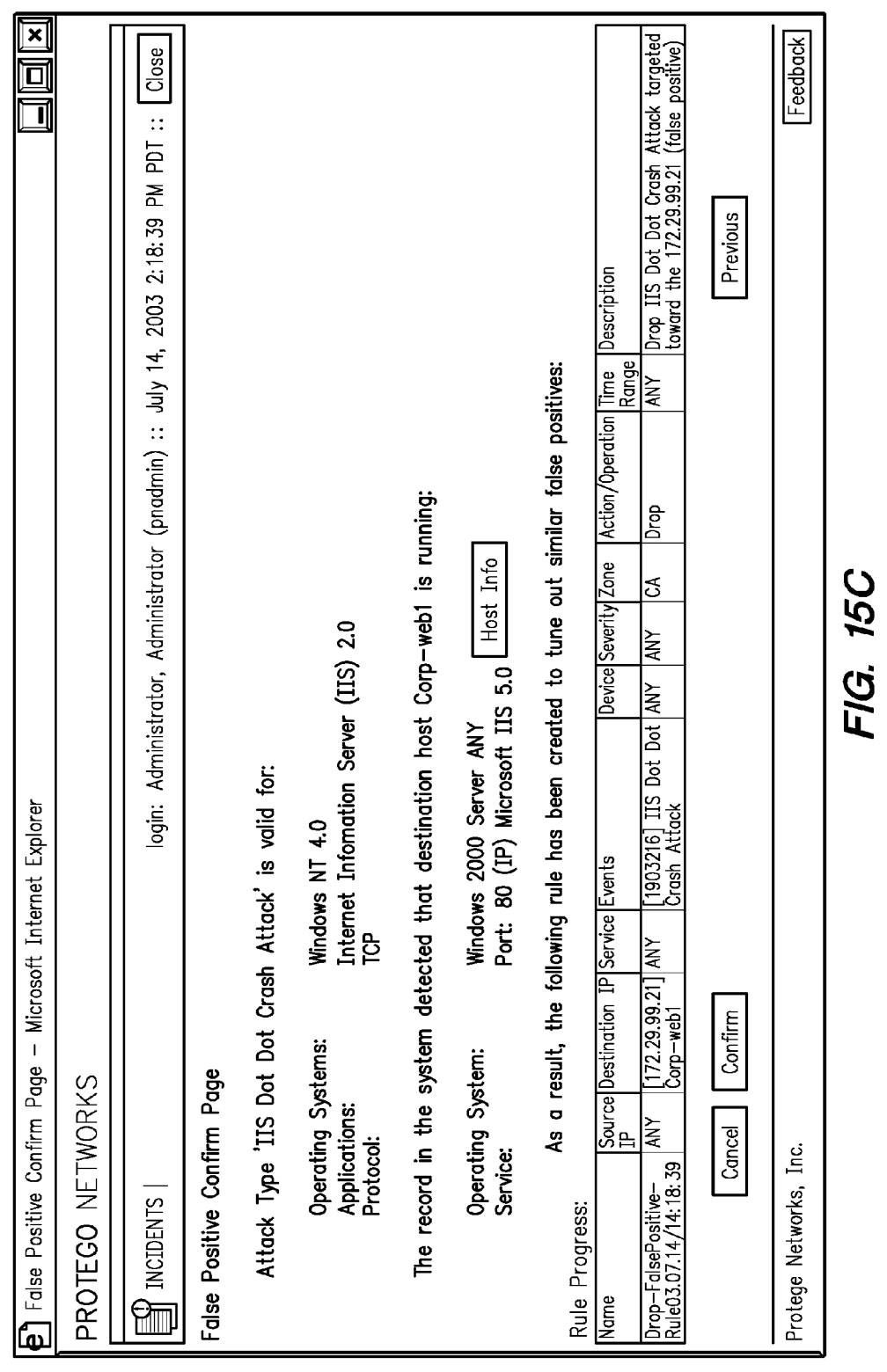

FIG. 15(C) shows the information with respect to the false positive security event as well as a new drop rule table created for this type of security event. The drop rule table is similar to the security event correlation rule table and the action of the drop rule table is to drop (i.e., ignore) any event that satisfies the requirements specified in the table. A drop rule table may comprise one row dropping one type of security events or multiple rows dropping multiple types of security events.

Figure 15D:
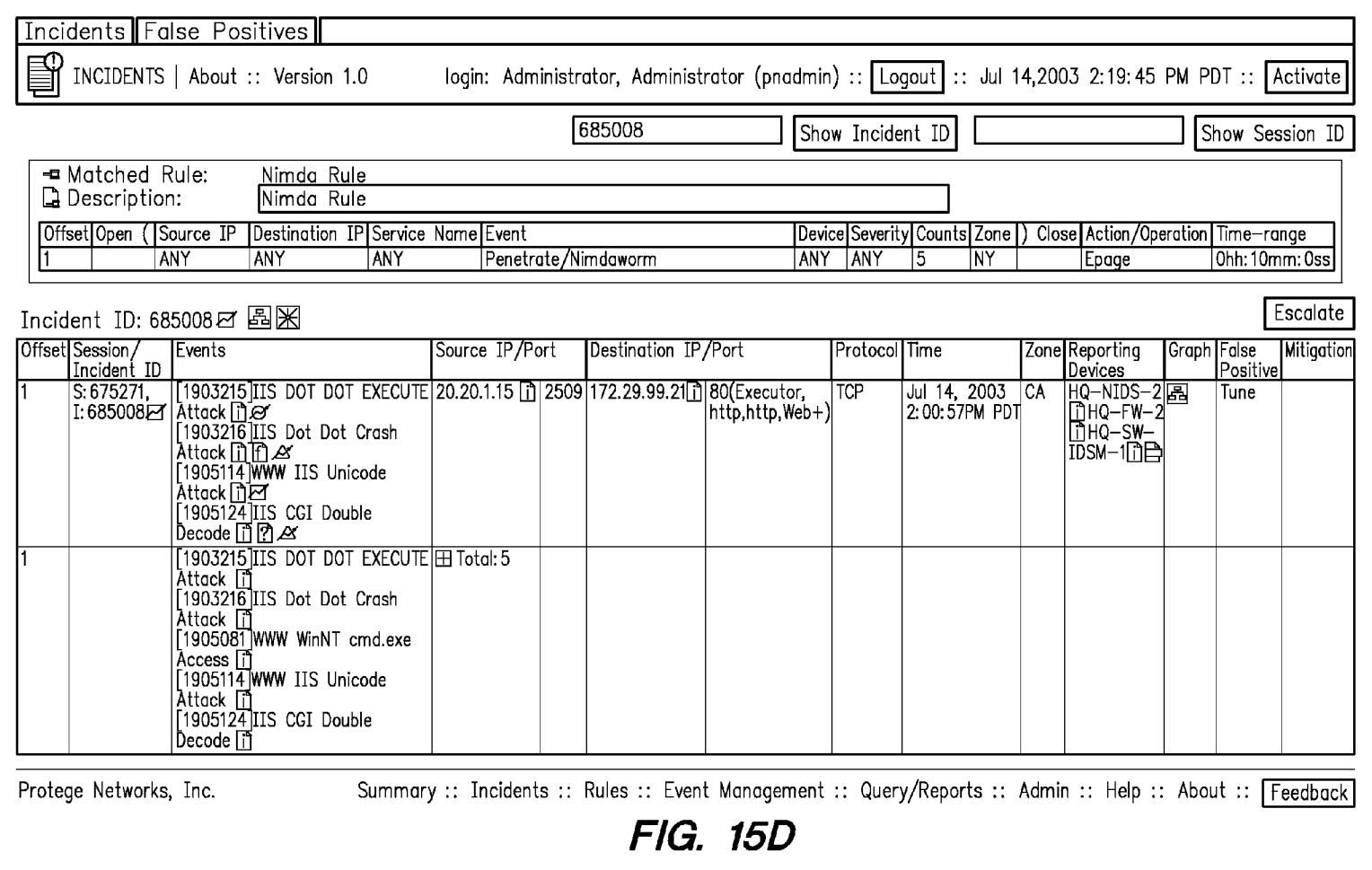

After the user confirms the creation of a new drop rule in FIG. 15(C), the system closes the pop-up window and the corresponding question mark icon in the network session list is replaced by a new icon having a character "F", indicating that this event has been marked as false positive, as shown in FIG. 15(D).

Figure 16A:

FIG. 16(A) depicts a list of drop rules gathered in a table associated with a "Drop Rules" tab to differentiate themselves from those security event correlation rules under an "Inspection Rules" tab. In this example, there are two drop rules, each for dropping one particular type of security events. FIG. 16(B) shows the incidents containing false positive events that have been identified by the system. The incidents have been divided into two groups, each associated with a respective drop rule. In one embodiment, if a user knows in advance that one type of security events should be treated as false positive, he can create a drop rule directly herein by clicking on the Add button in FIG. 16(A) instead of going through the process discussed above in conjunction with FIGS. 15(A)-(D).

As discussed above, a security event correlation rule is created to detect one or more kinds of network attacks. Since new network attacks may evolve in response to the improvement of network technology, new security event correlation rules have to be developed to deal with these new attacks. In one embodiment, the system generates a new security event correlation rule through querying recorded security event data and thereby discovering new attack scenarios.

Figure 17A:
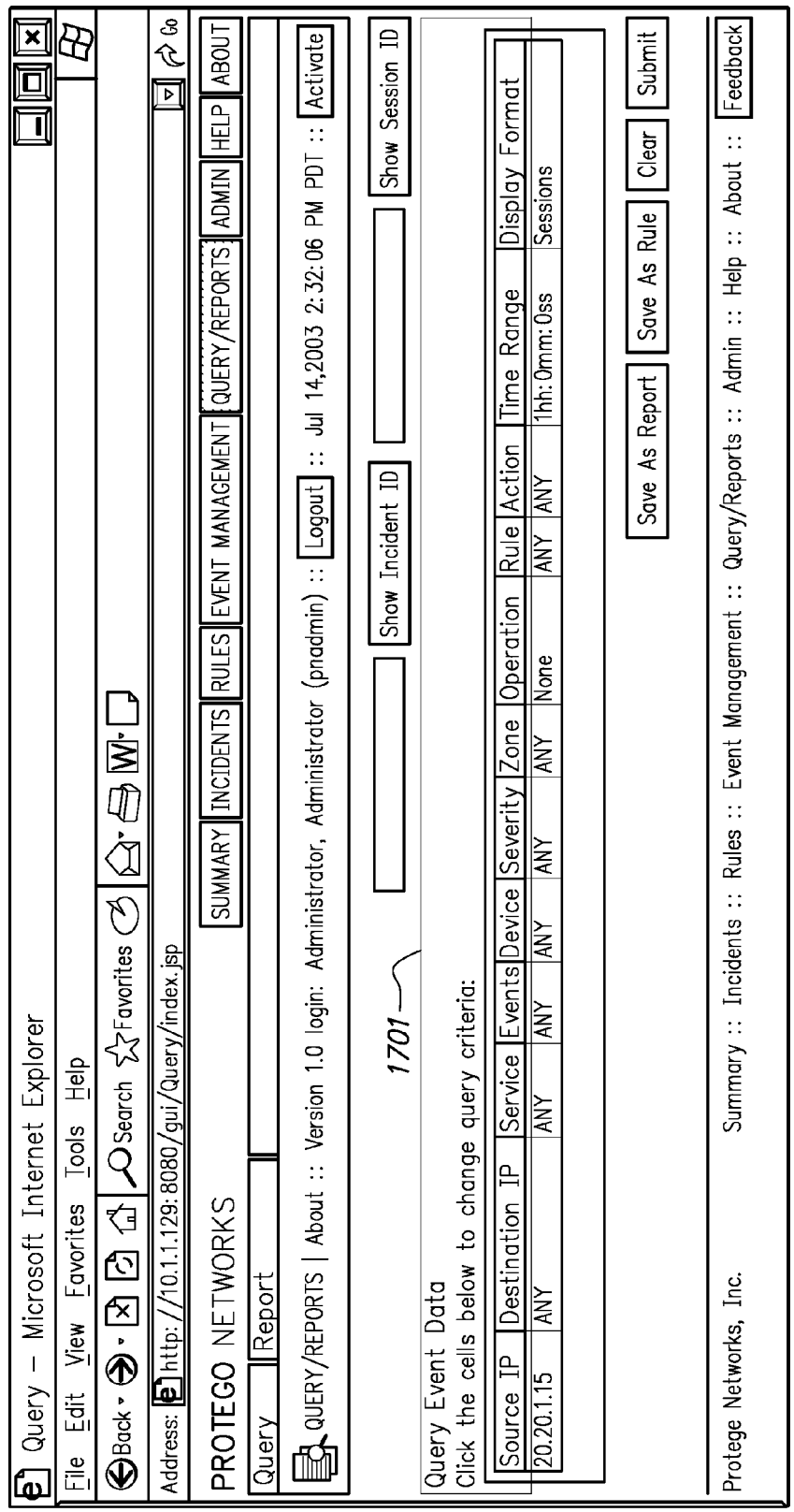

FIG. 17(A) illustrates a query table 1701 used for querying recorded security event data. The query table 1701 comprises a plurality of columns that are similar to the columns of a security event correlation rule table shown in FIG. 7. In this example, the source IP entry is set to be 20.20.1.15 and the time range entry is one hour. If a user submits this query to the database that contains the security event data, the system locates and displays information of the security events having 20.20.1.15 as their source and arriving at the system within last hour, and then group them under different incidents and different sessions.

Figure 17B:
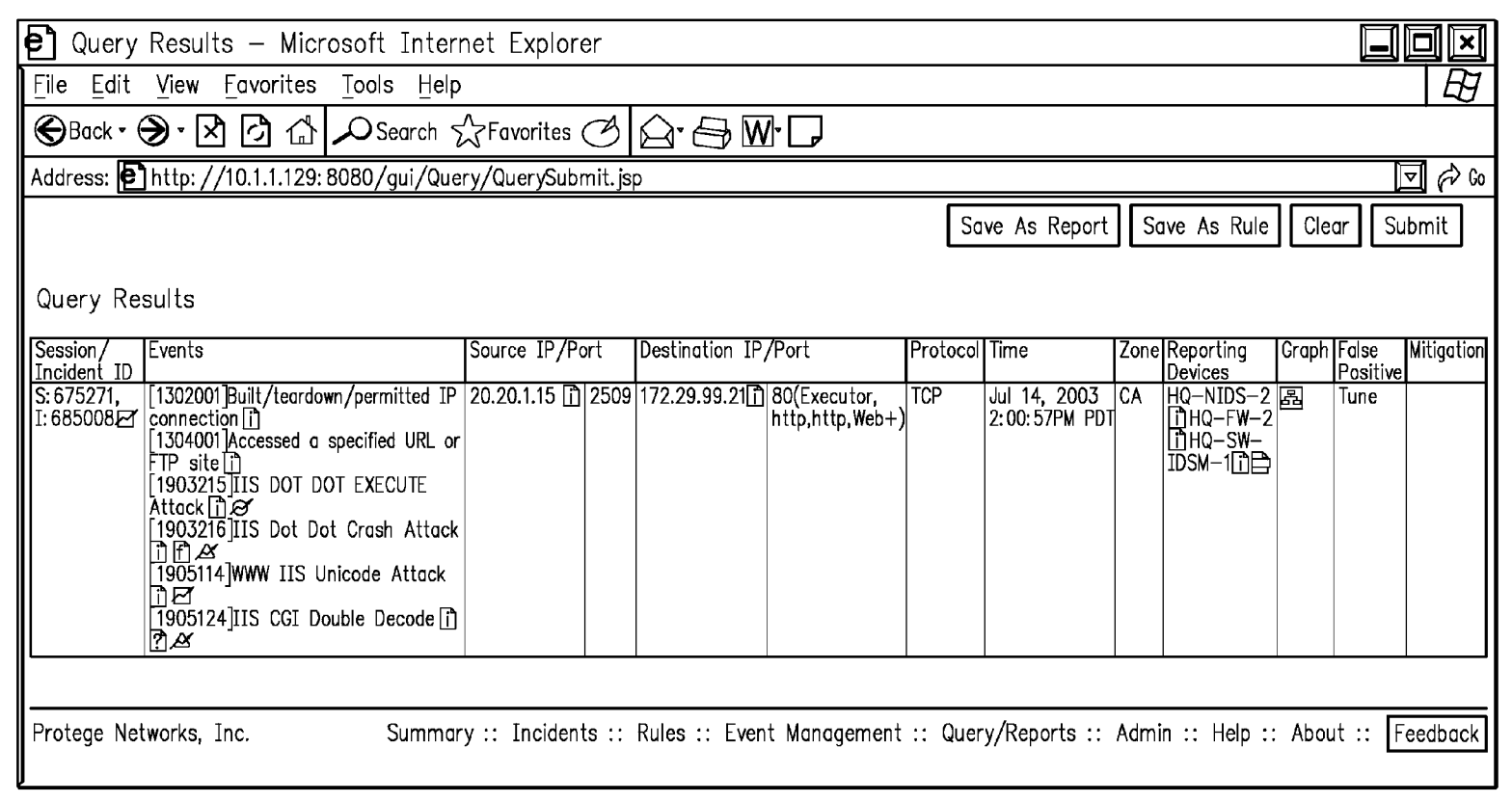

FIG. 17(B) shows the query result after the user submits the query to the database. Illustratively, this query result includes multiple security events under the same network session 675271 and the same security incident 685008. FIG. 17(C) has a new pop-up window 1702 that provides more details about different events in the network session 675271. The entries under the raw message column of this pop-up window explain what kind of network activities trigger these events and they are an important source for discovering new types of network attacks. If the user thinks the data pulled out by the query may indeed represent a potential threat to the network security, he can save the query as a new security event correlation rule by clicking on the "Save As Rule" button shown in FIG. 17(A) and thereby supplement the existing security event correlation rules.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method comprising:
   causing display of a table comprising rows of data arranged in columns;
   wherein data displayed in the table defines a set of network events that constitute a security incident;
   wherein data displayed in at least one row of the rows defines a subset of one or more network events of said set of network events;
   wherein data displayed in the at least one row specifies a plurality of network event constraints that define the subset;
   wherein the plurality of network event constraints comprises a source network address constraint, a destination network address constraint, and a network event type constraint;
   wherein the table is editable by a user to specify one or more network event constraints of said plurality of network event constraints;
   wherein data displayed in the at least one row specifies a current logical or temporal relationship between the subset and a set of one or more network events defined by data displayed in another row in the table;
   wherein the table is editable by a user to specify a new current logical or temporal relationship between the subset of one or more network events of said set of network events displayed in one row of the at least one row in the table and a set of one or more network events defined by data displayed in another row in the table;
   wherein the method is performed by one or more computing devices.

2. The method of claim 1, wherein the plurality of network event constraints further comprises a count constraint that specifies, as a necessary condition of the security incident, a minimum number of network events that must each satisfy all other constraints of the plurality of network event constraints.

3. The method of claim 1, wherein the current logical or temporal relationship between the subset and the set of one or more network events defined by data displayed in the another row is a logical relationship.

4. The method of claim 3, wherein the logical relationship is a logical OR relationship or a logical AND relationship.

5. The method of claim 1, wherein the current logical or temporal relationship between the subset and the set of one or more network events defined by data displayed in the another row is a temporal relationship.

6. The method of claim 5, wherein the temporal relationship specifies, as a necessary condition of the security incident, that at least one network event belonging to said subset must be detected before any network event belonging to the set of one or more network events defined by data displayed in the other row is detected.

7. The method of claim 1, wherein at least one of the source network address constraint and the destination network address constraint is dependent on either a source network address constraint or a destination network address constraint specified by data displayed in another row of the table.

8. A computer memory storing instructions which, when executed by one or more processors, cause the one or more processors to perform
   causing display of a table comprising rows of data arranged in columns;
   wherein data displayed in the table defines a set of network events that constitute a security incident;
   wherein data displayed in at least one row of the rows defines a subset of one or more network events of said set of network events;
   wherein data displayed in the at least one row specifies a plurality of network event constraints that define the subset;
   wherein the plurality of network event constraints comprises a source network address constraint, a destination network address constraint, and a network event type constraint;
   wherein the table is editable by a user to specify one or more network event constraints of said plurality of network event constraints;
   wherein data displayed in the at least one row specifies a current logical or temporal relationship between the subset and a set of one or more network events defined by data displayed in another row in the table;

wherein the table is editable by a user to specify a new current logical or temporal relationship between the subset of one or more network events of said set of network events displayed in one row of the at least one row in the table and a set of one or more network events defined by data displayed in another row in the table.

9. The computer memory of claim 8, wherein the plurality of network event constraints further comprises a count constraint that specifies, as a necessary condition of the security incident, a minimum number of network events that must each satisfy all other constraints of the plurality of network event constraints.

10. The computer memory of claim 8, wherein the current logical or temporal relationship between the subset and the set of one or more network events defined by data displayed in the another row is a logical relationship.

11. The computer memory of claim 10, wherein the logical relationship is a logical OR relationship or a logical AND relationship.

12. The computer memory of claim 8, wherein the current logical or temporal relationship between the subset and the set of one or more network events defined by data displayed in the another row is a temporal relationship.

13. The computer memory of claim 12, wherein the temporal relationship specifies, as a necessary condition of the security incident, that at least one network event belonging to said subset must be detected before any network event belonging to the set of one or more network events defined by data displayed in the other row is detected.

14. The computer memory of claim 8, wherein at least one of the source network address constraint and the destination network address constraint is dependent on either a source network address constraint or a destination network address constraint specified by data displayed in another row of the table.

15. A graphical user interface on a display, comprising:
a table comprising rows of data arranged in columns;
wherein data displayed in the table defines a set of network events that constitute a security incident;
wherein data displayed in at least one row of the rows defines a subset of one or more network events of said set of network events;
wherein data displayed in the at least one row specifies a plurality of network event constraints that define the subset;
wherein the plurality of network event constraints comprises a source network address constraint, a destination network address constraint, and a network event type constraint;
wherein the table is editable by a user to specify one or more network event constraints of said plurality of network event constraints;
wherein data displayed in the at least one row specifies a current logical or temporal relationship between the subset and a set of one or more network events defined by data displayed in another row in the table wherein the table is editable by a user to specify a new current logical or temporal relationship between the subset of one or more network events of said set of network events displayed in one row of the at least one row in the table and a set of one or more network events defined by data displayed in another row in the table.

16. The graphical user interface of claim 15, wherein the plurality of constraints further comprises a count constraint that specifies, as a necessary condition of the security incident, a minimum number of network events that must each satisfy all other constraints of the plurality of constraints.

17. The graphical user interface of claim 15, wherein the current logical or temporal relationship between the subset and the set of one or more network events defined by data displayed in the another row is a logical relationship.

18. The graphical user interface of claim 17, wherein the logical relationship is a logical OR relationship or a logical AND relationship.

19. The graphical user interface of claim 15, wherein the current logical or temporal relationship between the subset and the set of one or more network events defined by data displayed in the another row is a temporal relationship.

20. The graphical user interface of claim 19, wherein the temporal relationship specifies, as a necessary condition of the security incident, that at least one network event belonging to said subset must be detected before any network event belonging to the set of one or more network events defined by data displayed in the other row is detected.

21. The graphical user interface of claim 15, wherein at least one of the source network address constraint and the destination network address constraint is dependent on either a source network address constraint or a destination network address constraint specified by data displayed in another row of the table.

\* \* \* \* \*